(12) United States Patent
Choksi

(10) Patent No.: US 8,150,437 B2
(45) Date of Patent: Apr. 3, 2012

(54) ARCHITECTURE TO FACILITATE THE MONETIZATION OF DISPARATE, INTER-WORKED PUSHED TO TALK TECHNOLOGIES

(75) Inventor: Ojas Thakor Choksi, Herndon, VA (US)

(73) Assignee: Nextel Communications Company L.P., Reston, VA (US)

( * ) Notice: Subject to any disclaimer, the term of this patent is extended or adjusted under 35 U.S.C. 154(b) by 1057 days.

(21) Appl. No.: 11/223,746

(22) Filed: Sep. 8, 2005

(65) Prior Publication Data

US 2006/0063549 A1    Mar. 23, 2006

Related U.S. Application Data

(63) Continuation-in-part of application No. 11/047,897, filed on Feb. 1, 2005, now Pat. No. 7,359,726, and a continuation-in-part of application No. 11/047,892, filed on Feb. 1, 2005, now Pat. No. 7,359,731.

(60) Provisional application No. 60/608,113, filed on Sep. 9, 2004, provisional application No. 60/608,131, filed on Sep. 9, 2004, provisional application No. 60/608,117, filed on Sep. 9, 2004, provisional application No. 60/608,126, filed on Sep. 9, 2004, provisional application No. 60/608,110, filed on Sep. 9, 2004.

(51) Int. Cl.
*H04B 7/00* (2006.01)
*H04M 1/00* (2006.01)
*G01R 31/08* (2006.01)
*G06F 11/00* (2006.01)
*G06F 15/173* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04M 1/24* (2006.01)
*H04M 3/08* (2006.01)
*H04M 3/22* (2006.01)
*H04M 15/00* (2006.01)
*G06Q 30/00* (2006.01)

(52) U.S. Cl. ..... 455/518; 455/508; 455/521; 455/552.1; 370/238; 370/328; 370/352; 379/32.03; 379/112.01; 705/14.26; 709/223

(58) Field of Classification Search ................. 455/405, 455/406, 419, 427, 450, 457, 508, 518, 519, 455/426.1, 522, 433, 456.1, 509, 552.1, 407, 455/408, 432.1, 442, 466, 511, 517; 370/352, 370/218, 338, 271, 259, 312, 316, 320, 321, 370/328, 334, 335, 347, 349, 360, 395.2, 370/399, 400, 401, 431, 433, 466, 310, 327, 370/337, 340, 345, 409, 432, 441; 709/202, 709/227, 205; 379/114.28, 142.01, 201.01, 379/201.02

See application file for complete search history.

(56) References Cited

U.S. PATENT DOCUMENTS 5,483,575 A * 1/1996 Zdanowski et al. ........... 455/508
(Continued)

*Primary Examiner* — Andrew Wendell
*Assistant Examiner* — Paul P Tran

(57) ABSTRACT

An inter-working network includes a plurality of interfaces for facilitating communications with a plurality of dispatch networks, a signaling controller, a media gateway and a system for facilitating the monetization of inter-carrier dispatch communications. The signaling controller and media gateway generate dispatch call records for dispatch sessions facilitated through the inter-working network. The system includes a billing accumulator and a settlement entity. The billing accumulator is interfaced with the inter-working network and includes logic to receive and store the dispatch call data records from the inter-working architecture. The settlement entity is interfaced with the billing accumulator, and includes settlement logic for converting each stored dispatch call data record to a billing record for each of at least two of the dispatch networks.

20 Claims, 16 Drawing Sheets

U.S. PATENT DOCUMENTS

| | | | |
|---|---|---|---|
| 5,548,631 A * | 8/1996 | Krebs et al. | 455/426.1 |
| 5,802,145 A * | 9/1998 | Farris et al. | 379/32.03 |
| 5,812,533 A * | 9/1998 | Cox et al. | 370/259 |
| 5,913,164 A | 6/1999 | Pawa et al. | |
| 6,363,411 B1 * | 3/2002 | Dugan et al. | 709/202 |
| 6,526,043 B1 * | 2/2003 | Fogelholm et al. | 370/352 |
| 6,775,267 B1 * | 8/2004 | Kung et al. | 370/352 |
| 6,792,281 B2 * | 9/2004 | Upp et al. | 455/519 |
| 6,885,857 B1 * | 4/2005 | Hanson | 455/406 |
| 7,453,837 B2 * | 11/2008 | Jiang et al. | 370/320 |
| 7,609,682 B2 * | 10/2009 | Ang et al. | 370/349 |
| 2002/0145981 A1 * | 10/2002 | Klinker et al. | 370/244 |
| 2003/0117954 A1 * | 6/2003 | De Neve et al. | 370/230 |
| 2003/0236093 A1 | 12/2003 | Drozt et al. | |
| 2004/0032843 A1 | 2/2004 | Schaefer et al. | |
| 2004/0062370 A1 * | 4/2004 | O'Neal et al. | 379/112.01 |
| 2004/0066782 A1 * | 4/2004 | Nassar | 370/389 |
| 2004/0082352 A1 * | 4/2004 | Keating et al. | 455/519 |
| 2004/0133683 A1 | 7/2004 | Keller et al. | |
| 2004/0190535 A1 * | 9/2004 | Albal et al. | 370/401 |
| 2005/0215250 A1 | 9/2005 | Chava et al. | |
| 2006/0019690 A1 | 1/2006 | Zufall | |
| 2006/0025122 A1 | 2/2006 | Harris et al. | |

* cited by examiner

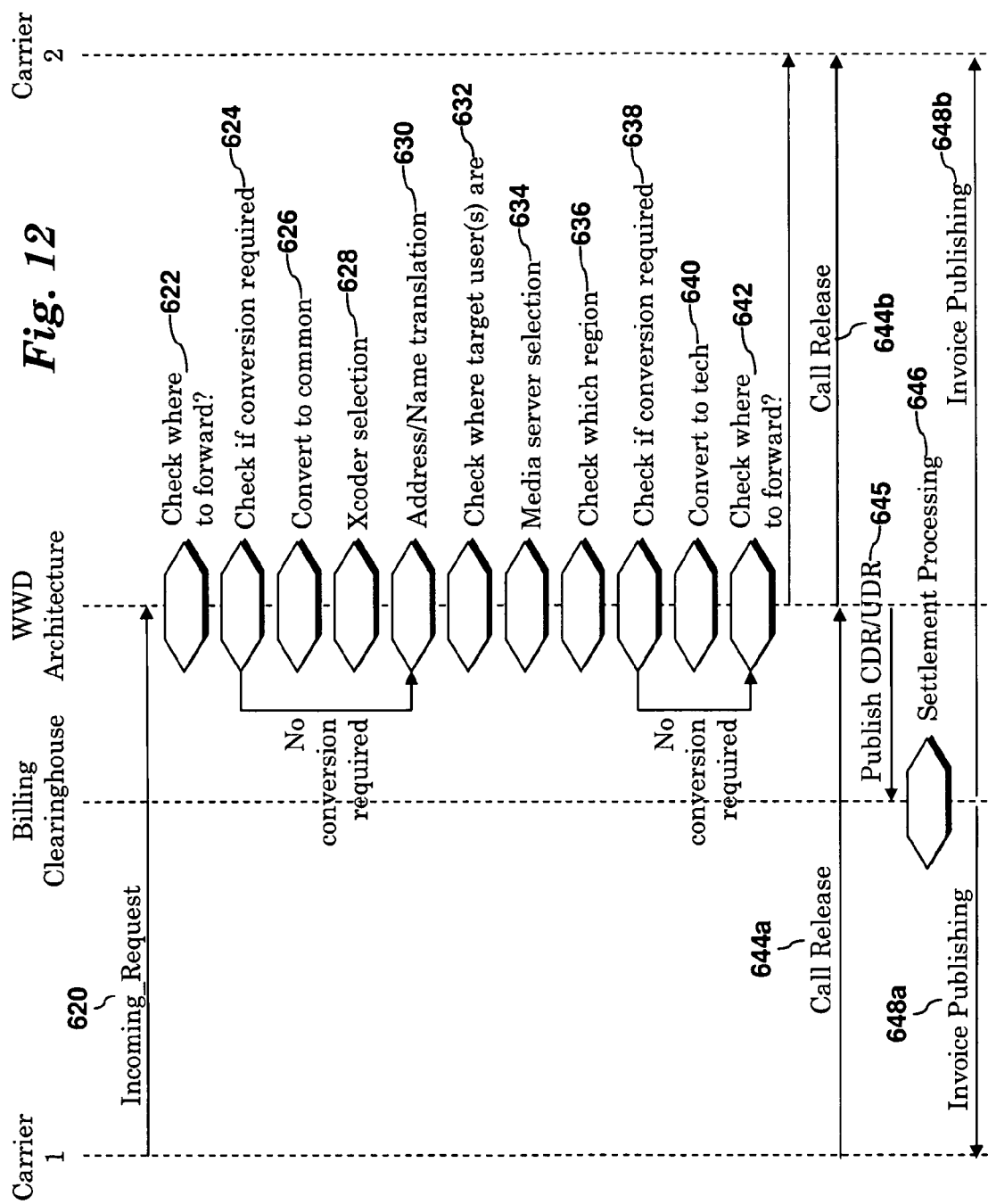

ns. 11/047,897 and 11/047,892, both of which were filed on Feb. 1, 2005, and claims priority to U.S. Provisional Patent Application Nos. 60/608,113, 60/608,131, 60/608,117, 60/608,126 and 60/608,110, all of which were filed on Sep. 9, 2004, the disclosures of which are incorporated herein by reference.

ARCHITECTURE TO FACILITATE THE MONETIZATION OF DISPARATE, INTER-WORKED PUSHED TO TALK TECHNOLOGIES

CROSS-REFERENCE TO RELATED APPLICATIONS

The present invention is a continuation-in-part of U.S. patent application Ser. Nos. 11/047,897 and 11/047,892, both of which were filed on Feb. 1, 2005, and claims priority to U.S. Provisional Patent Application Nos. 60/608,113, 60/608,131, 60/608,117, 60/608,126 and 60/608,110, all of which were filed on Sep. 9, 2004, the disclosures of which are incorporated herein by reference.

FIELD OF THE INVENTION

The present invention relates generally to push-to-talk (PTT) wireless communications systems and more particularly to systems and methods for facilitating the monetization of disparate, inter-worked PTT networks.

BACKGROUND OF THE INVENTION

Wireless communications systems are operated worldwide by wireless carriers who charge fees to wireless subscribers for use of the carrier's services such as interconnect, short message service (SMS), packet data and push-to-talk. Each wireless communications system services subscribers within a geographic coverage area and operates using one or more wireless technologies such as code division multiple access (CDMA), global system for mobile communication (GSM), time division multiple access (TDMA) or Advanced Mobile Phone Service (AMPS).

PTT services (also known as a walkie-talkie or dispatch services) are currently offered by some wireless carriers, such as Nextel's Direct Connect® service, and new PTT services and technologies have been proposed. Generally, a PTT call provides near-instant, half-duplex communication between a PTT caller and a target group of PTT users. PTT calls are currently limited to calls between wireless users who use compatible PTT technologies and are subscribers on the same carrier network. For example, subscribers on a network operated by a first wireless carrier cannot engage in PTT calls with PTT subscribers on a network operated by a second wireless carrier.

Proprietary solutions have been proposed to connect two or more PTT networks, but such solutions typically require each PTT network to connect separately to each of the other PTT networks. Many proposed solutions also require extensive modification to, and administration by, each carrier network and are not practical for connecting a large number of wireless carriers and technologies on a worldwide basis. Accordingly, a need exists for an inter-working network architecture that is optimized for PTT communications among subscribers on different carrier networks, irrespective of subscriber and carrier location and underlying PTT technology. A further need exists for an architecture and method to generate revenue for the use of an inter-working architecture and to facilitate revenue sharing and billing between disparate PTT carriers.

SUMMARY OF THE INVENTION

The present invention is a system and method for facilitating the monetization of disparate, inter-worked PTT networks. In one embodiment, a system for facilitating the monetization of inter-carrier dispatch communications is operable with an inter-working architecture for facilitating dispatch communications between a plurality of dispatch networks. The system includes a billing accumulator and a settlement entity. The billing accumulator is interfaced with the inter-working architecture, and includes logic to receive and store dispatch call data records from the inter-working architecture. The settlement entity is interfaced with the billing accumulator and includes settlement logic for converting each stored dispatch call data record to a billing record for each of at least two of the dispatch networks.

In another embodiment of the present invention, a network for inter-working a plurality of dispatch networks, at least two of the dispatch networks having incompatible technologies, includes a billing clearinghouse, a plurality of points-of-presence and a plurality of border gateways. The billing clearinghouse stores call detail records and usage data reports relating to dispatch sessions implemented across the network. The points-of-presence are connected to the billing clearinghouse, and generate the call detail records and usage data reports. The border gateways interface each of the dispatch networks to at least one of the plurality of points-of-presence.

In another embodiment of the present invention, a method for monetizing the inter-working of a plurality of disparate dispatch networks, each dispatch network providing dispatch services to a plurality of subscriber units includes receiving a dispatch session request from an originating dispatch network, the dispatch session request identifying a target user, and processing, in a point-of-presence, the dispatch session request, including allocating signaling and media resources. Next, the dispatch session request is forwarded to a border gateway associated with the target dispatch network and the dispatch session between the originating dispatch network and target dispatch network is facilitated. An invoice is generated for each of the originating dispatch network and target dispatch network, including charges for facilitating the dispatch session.

BRIEF DESCRIPTION OF THE DRAWINGS

FIG. 12 is a call flow illustrating an operation of the PTT inter-working architecture of the third embodiment;

DETAILED DESCRIPTION OF EXEMPLARY EMBODIMENTS

Figure 1:
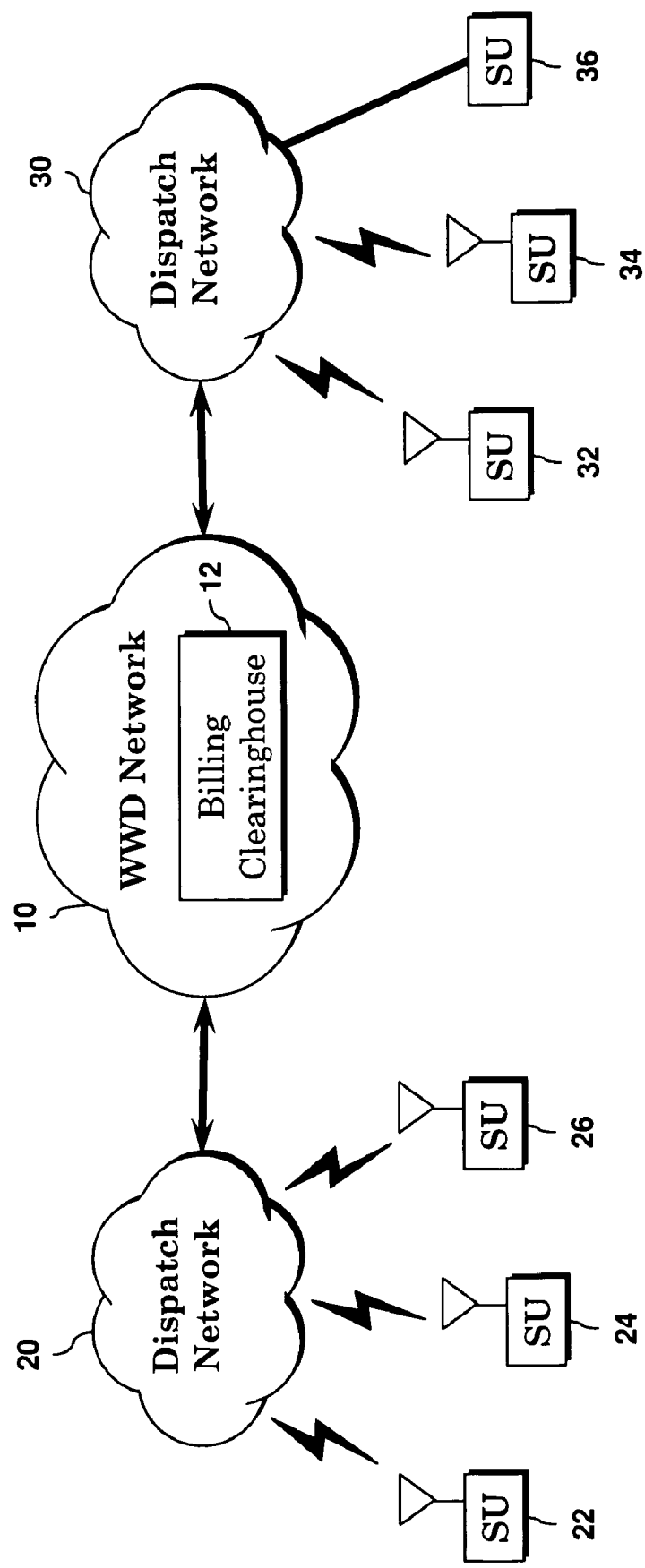
FIG. 1 is a block diagram illustrating a worldwide dispatch network in accordance with an embodiment of the present invention.

An embodiment of a worldwide dispatch architecture of the present invention will now be described with reference to FIG. 1. An inter-working architecture 10, referred to herein as a worldwide dispatch (WWD) architecture, provides a core infrastructure to which dispatch service providers may connect to enable inter-carrier and cross-technology dispatch sessions. The WWD network 10 assists in translating and managing dispatch sessions between a plurality of dispatch networks, such as dispatch network 20 and dispatch network 30, and includes a billing clearinghouse system 12 that stores call detail records (CDRs) and usage data reports (UDRs) to track, bill and provide settlement services relating to the usage of the WWD network 10.

The dispatch networks 20 and 30 may be any communications systems, including wireless and wireline networks, that facilitate dispatch communications between at least two devices. As illustrated, the dispatch network 20 is a communications network that facilitates dispatch calls between a plurality of subscriber units (SU), such as SUs 22, 24 and 26. The dispatch network 30 is a communications network that facilitates dispatch calls between a plurality of subscriber units, such as SUs 32, 34 and 36. The dispatch networks 20 and 30 may be operated by different carriers and may use different dispatch technologies and protocols.

The subscriber units may include any device that is adapted for dispatch communications with one or more of the dispatch networks. For example, the subscriber units may include wireless devices that are adapted to communicate with a dispatch network over a wireless communications link, including mobile telephones, personal digital assistants, and portable computers. The subscriber units may also include wireline devices, such as SU 36, coupled to a dispatch network through a physical connection, such as through the Internet. The dispatch networks may communicate using any of a number of dispatch protocols and technologies such as an Integrated Dispatch Enhanced Network (trademarked by Motorola, Inc. as iDEN® and hereinafter referred to as "iDEN"), a network offering high performance push-to-talk (HPPTT) functionality, such as the functionality offered by Qualcomm, Inc. under the trademark QChat®, or a PTT over Cellular network (PoC). It will be appreciated that the illustrated embodiment is exemplary and that any number of networks, wireless and wireline devices may be inter-worked to operate with the WWD network 10.

In operation, a user may initiate a dispatch call with any other user connected to the WWD network 10. For example, user 22 may initiate a dispatch call with user 32. The dispatch network 20 will recognize that user 32 is not a subscriber of the dispatch network 20 and will forward an initial dispatch request to the WWD network 10. The WWD network 10 determines the address and location of the user 32, allocates necessary resources for handling the dispatch call, and forwards the initial request to dispatch network 30. The dispatch network 30 processes the initial request and responds to the WWD network 10. The WWD network 10 manages the dispatch session between user 22 and user 32 and performs any necessary translation between the formats and protocols of dispatch network 20 and dispatch network 30.

Figure 2:
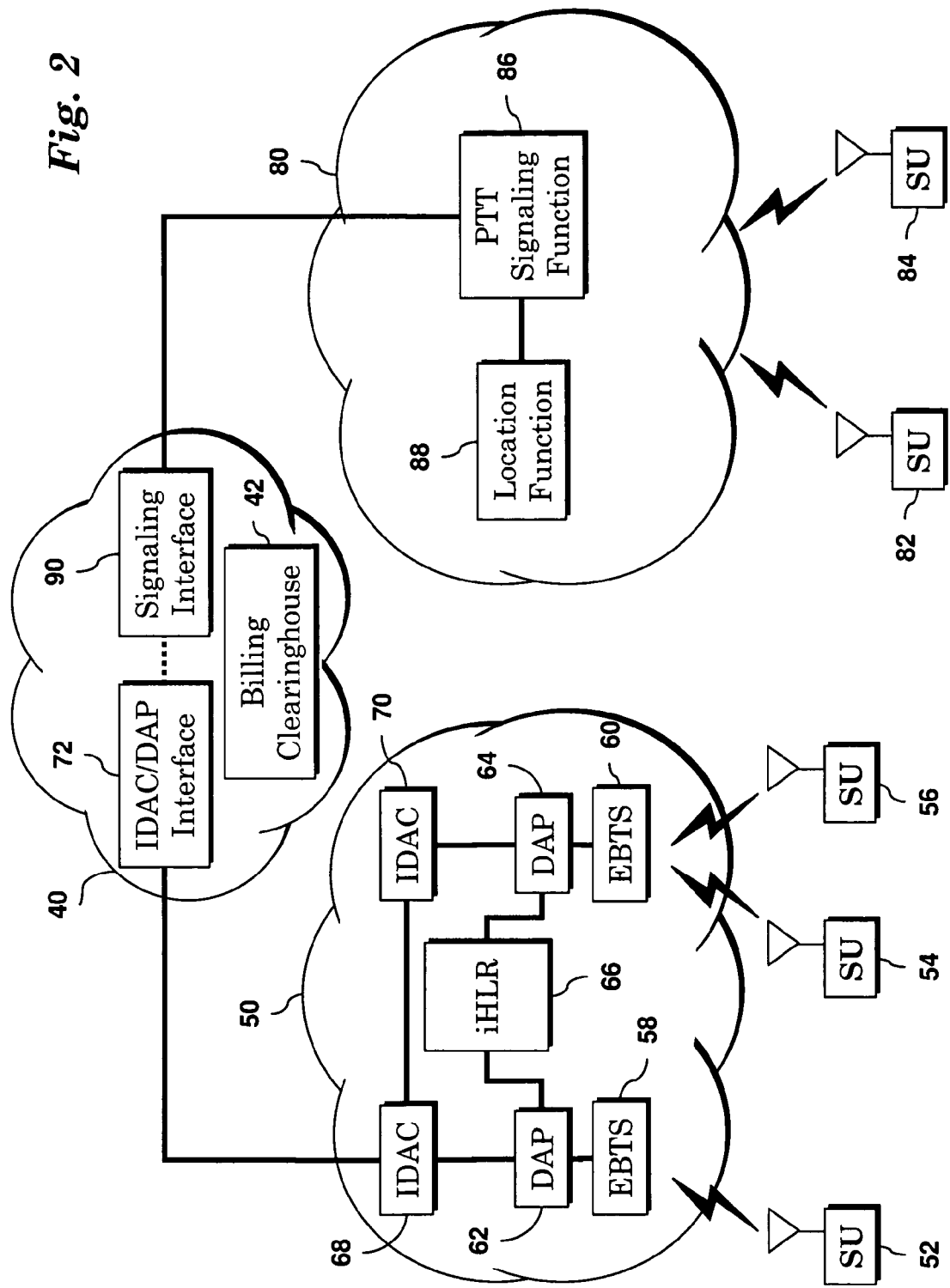
FIG. 2 illustrates functional interfaces between a worldwide dispatch network and PTT networks in accordance with an embodiment of the present invention.

An embodiment of the interface between a WWD network and dispatch networks is illustrated in FIG. 2. A WWD network 40 is connected to a plurality of PTT networks, including an iDEN network 50 and a generic PTT network 80. The WWD network 40 includes a billing clearinghouse 42 for the monetization of communications facilitated by the WWD network 40. In an alternate embodiment, one or more PTT networks may be connected to the WWD network 40 via a GPRS Roaming exchange network or CDMA roaming exchange network.

Figure 3:
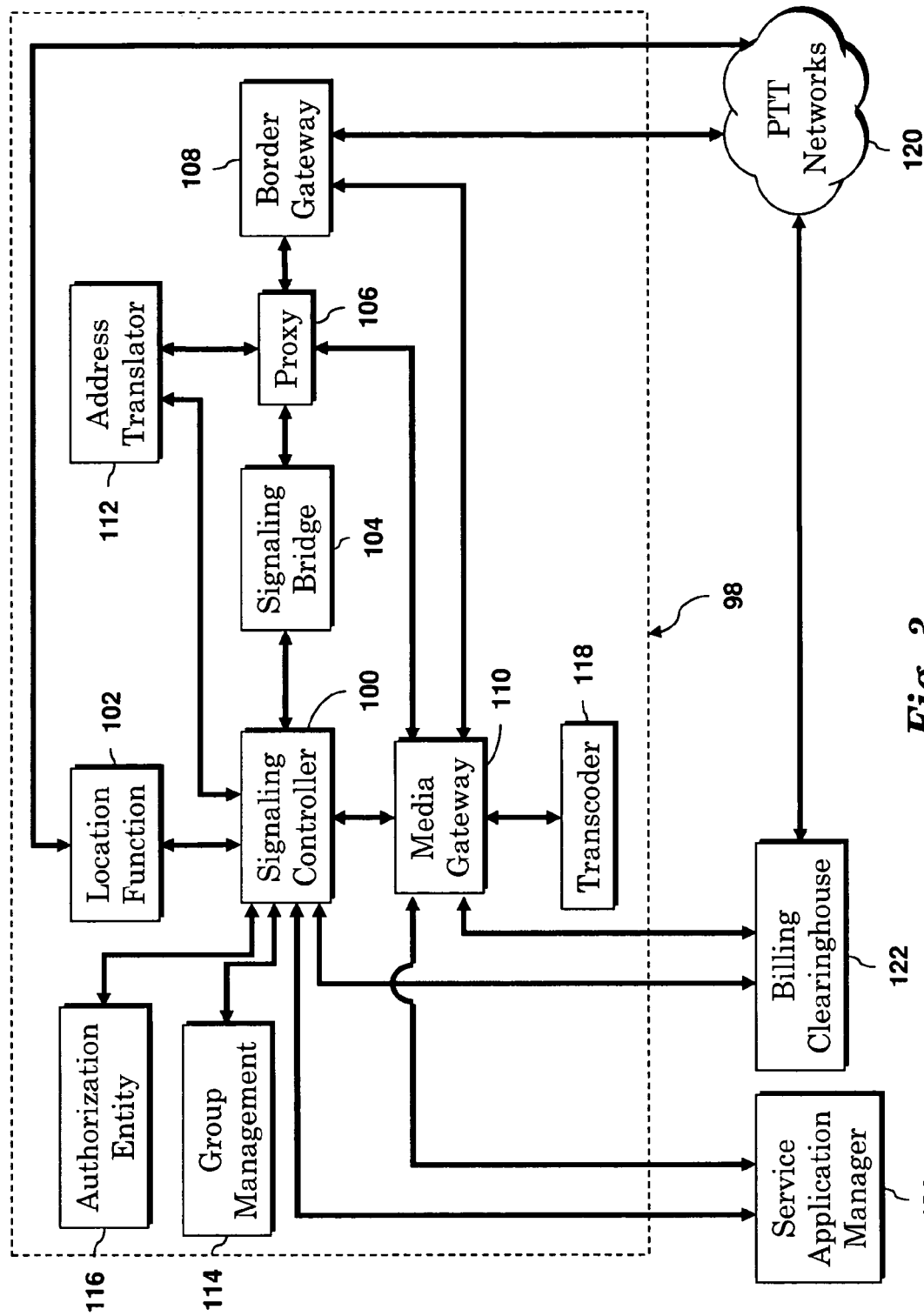
FIG. 3 is a block diagram illustrating functional elements of a worldwide dispatch architecture in accordance with an embodiment of the present invention.

The iDEN network 50 provides wireless PTT services to a plurality of subscriber units 52, 54 and 56. The iDEN network 50 includes a plurality of iDEN base stations known as enhanced base transceiver systems (EBTSs 58 and 60), a plurality of dispatch controllers known as iDEN dispatch application processors (DAPs 62 and 64) and an iDEN Home Location Register 66 (iHLR). The iDEN network 50 may also include a plurality of iDEN dispatch access controllers (iDACs 68 and 70) that facilitate PTT calls across iDEN urban areas. It will be appreciated that the iDEN network 60 illustrated in FIG. 3 is exemplary and that other network configurations can be utilized with the WWD network 40 of the present invention.

In operation, EBTS 58 provides wireless services to the subscriber unit 52, and EBTS 60 provides wireless services to the subscriber units 54 and 56. Subscriber unit 52 may initiate an ad hoc group PTT call with other subscribers on the iDEN network 60, such as subscriber units 54 and 56, by transmitting a PTT request to its local EBTS 60, which forwards the request to DAP 62. DAP 62 interfaces with the iHLR 66 to determine the location of the target subscriber units 54 and 56. DAP 62 (the controlling DAP) next communicates with DAP 64 (the remote DAP) to page the subscriber units 54 and 56, setup the PTT call, and manage the PTT call.

Subscriber unit 52 may also initiate a group PTT call with subscriber units 82 and 84 that are serviced by PTT network 80. In the exemplary embodiment, the location of subscriber units 82 and 84 are not known to the DAP 62 and iHLR 66, and the iDEN network 50 is configured to forward such foreign (or otherwise unknown) PTT targets to the WWD network 40. The iDEN network 50 is connected to the WWD network 40 through an iDAC/DAP interface 72. In this manner the WWD network 40 is seen by the iDEN network 50 as another DAP, i.e., a standard component of the iDEN network. DAP 62 (the controlling DAP) communicates with the iDAC/DAP interface 72 (the remote DAP) to page the mobile stations 82 and 84, setup the PTT call and manage the PTT call. Because the WWD network 40 is seen as a DAP by the iDEN network 50, no further modification of the iDEN network is necessary.

The PTT network 80 interfaces with the WWD network 50 in a similar manner. The PTT network 80 includes a PTT signaling function 86 that manages PTT sessions between a plurality of PTT network subscribers, such as subscriber units 82 and 84. In operation, the subscriber unit 82 may initiate a PTT call to another subscriber on the PTT network 80, such as subscriber unit 84. The PTT signaling function 86 receives the initial PTT request, works with the location function 88 to determine the location of the target subscriber unit 84, forwards the PTT request to the target subscriber unit 84, sets up and manages the PTT call.

The subscriber unit 82 may also initiate a PTT call to a target subscriber unit on a different PTT network, such as subscriber unit 52 on iDEN network 50. In accordance with an embodiment of the present invention, the PTT signaling function 86 is adapted to forward foreign target addresses, such as an address of a user not currently being serviced by the PTT network 80, to the WWD network 40. The WWD network 40 includes a PTT signaling controller interface 90 for interfacing with the PTT signaling function 86. In one embodiment, the signaling interface 90 is seen by the PTT signaling function 86 as a common network element of the PTT network 80, such as a remote signaling controller. The PTT signaling function 86 forwards the session request to the PTT signaling interface 90. The WWD network 50, through the iDAC/DAP interface 72 forwards the session request to the iDEN network 50 which processes the request in substantially the same manner as if it came from an internal iDEN DAP.

The WWD network 40 performs the necessary signaling translation between the originating and the terminating legs of a PTT session and ensures that appropriate media resources are allocated to service the PTT session. The WWD network 40 also translates in-session requests including the addition of a member to the PTT call and deletion of a member from a group call. In one embodiment, the WWD network 40 is adapted to translate across talker arbitration protocols implemented by various PTT technology vendors, including via the signaling plane using SIP method(s) and via the bearer plane using extensions to the RTCP protocol.

An embodiment of a WWD architecture will now be described with reference to the functional block diagram of FIG. 3. It should be noted that the functional components in FIG. 3 are not necessarily individual physical components or software modules, and that one or more components may be combined into a single physical component or software module or distributed across a plurality of physical devices and locations. Various physical architectures will be discussed in connection with FIGS. 4-13.

A WWD architecture 98 includes a signaling controller 100 that manages communications across PTT carriers and technologies. The signaling controller 100 is adapted to locate target users from the addresses received from the calling network. The PTT network on which the target user is located is determined via lookup by querying the address translator 112 and the location function 102. In one embodiment, the domain portion of the target user address is used to identify the target PTT network 120. After the PTT networks are identified, a determination is made as to whether transcoding is required between the calling PTT network and target PTT network through a transcoder 118. The signaling controller 100 may also host and manage sessions for roaming subscribers and locate users in a WWD roaming database. It is further contemplated that the signaling controller 100 may perform admission control to prevent unwanted access to the WWC architecture 98 and, with respect to authorized PTT access, enforce restrictions based on resource availability and contractual terms and conditions.

A location function entity 102 is connected to the signaling controller 100. The location function 102 assists in PTT registration of roaming subscribers across PTT networks 120 in the WWD network, tracks the locations of roaming users and notifies the signaling controller 100 of roaming user location for appropriate routing of incoming sessions. The location function 102 also interfaces with corresponding location functions of participating PTT networks to perform registration of roaming subscribers.

A signaling bridge 104 converts session and signaling messages from one PTT technology to another. In one embodiment, each PTT technology is translated into a format that is common across the WWD network based on a static mapping of the applicable network address to the corresponding PTT technology. In one embodiment, the common network protocol is based on SIP (session initiation protocol), with extensions added as necessary to facilitate the communications described herein. Alternatively, the translation may be based on an explicit protocol type embedded in the messages. The signaling bridge 104 is interfaced with the signaling controller 100, which uses the interface to exchange signaling messages with the signaling bridge 104 in a common format.

A proxy 106 analyzes incoming session requests to determine whether the originating and terminating PTT networks use the same PTT technology. If the same PTT technology is used then the proxy 106 facilitates communications between the originating and terminating PTT networks without translation. The proxy 106 is adapted to optimize the latency performance of sessions originating from and terminating to subscribers with the same PTT technology but belonging to different carrier networks. If different technologies are used, then the session is routed to the signaling bridge 104 for translation. In one embodiment, the proxy 106 makes routing decisions based on address translation data received from an address translator 112. Alternatively, the proxy 106 may make routing decisions based on PTT protocol type information embedded in the session header. In one embodiment, the proxy 106 is interfaced with the media gateway 110, and the proxy 106 routes sessions to the media gateway 110 when signaling translation is not required (due to the same signaling format being used between PTT networks), but media translation is required (due to different media formats being used between PTT networks).

A group management entity 114 is connected to the signaling controller 100 for managing inter-network group sessions on behalf of PTT carriers. The group management entity 114 provides group definitions to the signaling controller 100 and brokers and assists in the propagation definition of groups spanning across multiple PTT carriers. The group management entity 114 includes an interface to group management servers associated with one or more of the PTT networks 120. In one embodiment, the group management entity 114 also provides group definitions to a service application manager 124. The service application manager 124 interfaces with the WWD architecture 98 to provide static and dynamic data to PTT applications to process and deliver value added features to subscribers of the PTT networks.

The authorization entity 116 is connected to the signaling controller 100 and operates to manage call restrictions and authorization data for roaming subscribers and session requests to and from subscribers to applications from the service application manager 124.

In one embodiment, the WWD network 98 authorizes PTT sessions at the carrier level, and assumes that a subscriber initiating a PTT session has already been authenticated and authorized by the originating carrier. Access to applications available through the WWD network 98 are also authorized at the carrier level rather than at the subscriber level. In this manner, individual subscribers will not have to register with the WWD network 98 to enable cross-carrier PTT services.

The WWD network 98 is adapted to translate user addresses to identify the terminating network, perform appropriate translation and route the translated sessions to the proper target network. These translation functions are performed by the address translator 112. The address translator 112 provides translation services to the proxy 106 and the signaling controller 100 to map domains into IP addresses to properly route session messages. In the event different naming conventions are used across two or more PTT networks 120, the address translator 112 also provides translation of user addresses. In alternate embodiments, the user address translation may be performed at the signaling controller 100 or the signaling bridge 104. It is further contemplated that individual PTT networks 120 may perform user address translation within the PTT network.

The media gateway 110 is interfaced with the signaling controller 100 and is used to setup media paths, exchange media type and type of transcoding to be done by the media gateway 110. The MEGACO (media gateway control) protocol with enhancements may be used for this interface. The media gateway 110 is also interfaced with the PTT networks 120 to exchange and transport media packets between the WWD network 98 and the PTT network's media gateways.

In one embodiment, the media gateway 110 also performs jitter buffering to minimize the variable delays encountered inside and outside of the WWD administrative domain. The media gateway 110 also performs latency smoothing to avoid floor starvation during a group call spanning two or more carriers. In another embodiment, the media gateway 110 schedules session streams in accordance with service level agreements with associated PTT carriers to ensure appropriate treatment is accorded to the media per the agreements.

The transcoder 118 translates between voice formats to facilitate voice sessions across a plurality of carriers and technologies. The transcoder 118 is used when the end points of a session do not support a common codec. In one embodiment, the transcoder 118 is implemented as part of the media gateway 110.

In the exemplary embodiment, the border gateway 108 is connected to the media gateway 110 via an IP network. The signaling and media traffic between the WWD network 98 and the PTT networks 120 passes through the border gateway 108. The border gateway 108 hosts the necessary trust relationships and related security associations between the WWD network 98 and the PTT networks 120. In one embodiment, the border gateway 108 performs metering, marking, classifying and policing of the traffic traversing the border gateway 108 in both directions in accordance with aggregate carrier service level agreements, which may include multiple levels of quality of service including requirements specifying network availability, latency and packet loss rate and service availability and denial and billing accuracy.

Each PTT network 120 is connected to the WWD network 98 through the border gateway 108. In the exemplary embodiment, IPSEC (IP Security Protocol) association may be the basis of the interface between the border gateway 108 and the PTT networks 120. In one embodiment, a public IP address is assigned to each WWD service element that has an external interface accessible to the PTT networks 120 including: the border gateway 108, the proxy 106, the media gateway 110, the location server 102, the group management entity 114 and the address translator 112.

A billing clearinghouse 122 collects and aggregates UDRs and CDRs from the signaling controller 100 and media gateway 110. The billing clearinghouse 122 includes a settlement function that applies settlement logic to the collected data to perform reconciliation and create inter-carrier settlement invoices for the WWD sessions.

In the exemplary embodiment, each PTT network 120 is assumed to be a separate administrative domain that includes a call control function that manages PTT sessions within the PTT network, a media server, a talker arbitration function for managing floor control during a PTT session, and a group management function for administering group calls. The PTT network may also include other functional entities such as a registration/authentication function to ensure a caller is a valid subscriber, a compression function for efficient utilization of bandwidth, a service discovery function to locate network elements, and a location function for assisting in authentication and a roaming/authorization function.

Figure 4:
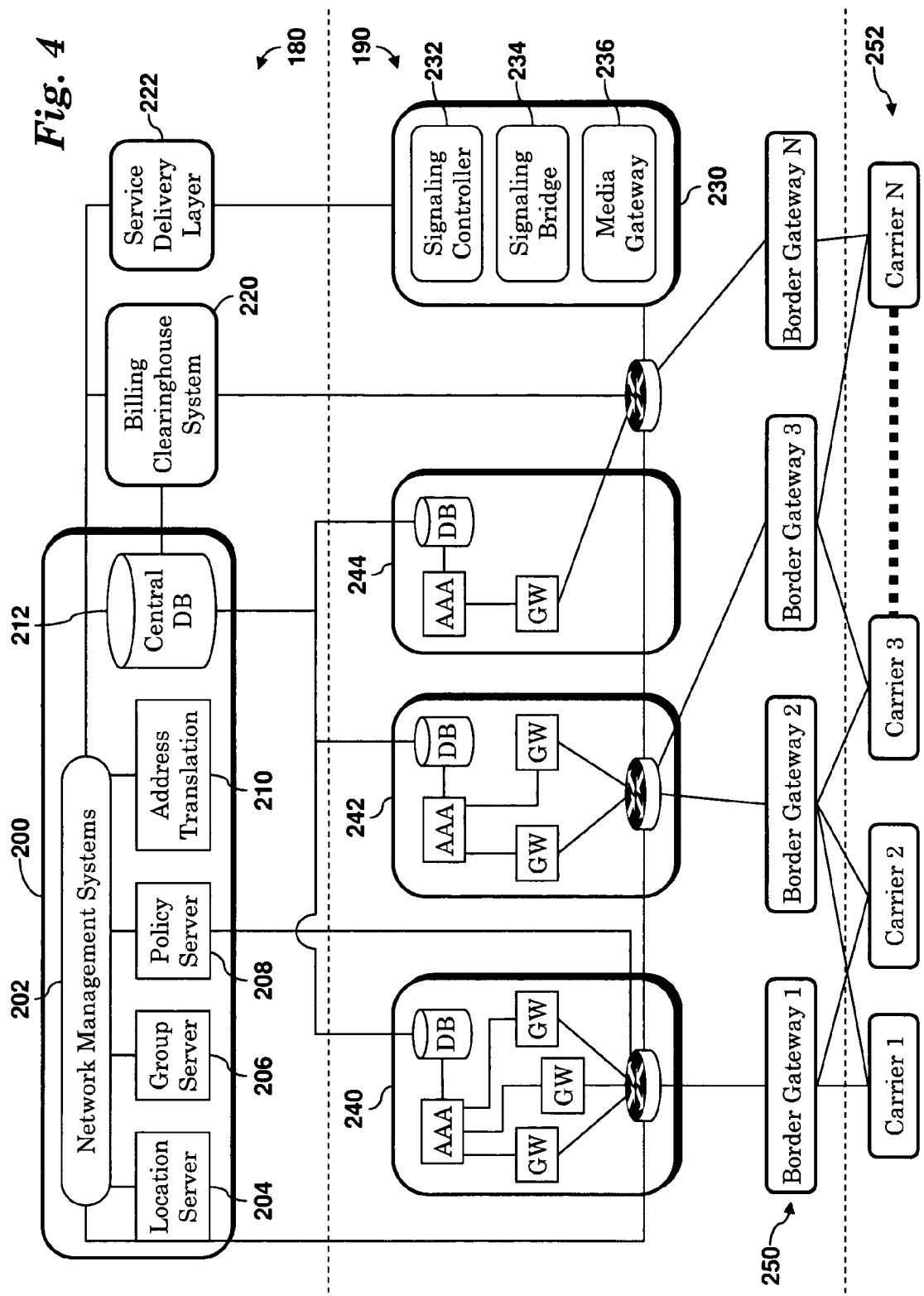
FIG. 4 illustrates a first embodiment of a PTT inter-working architecture.
Figure 5:
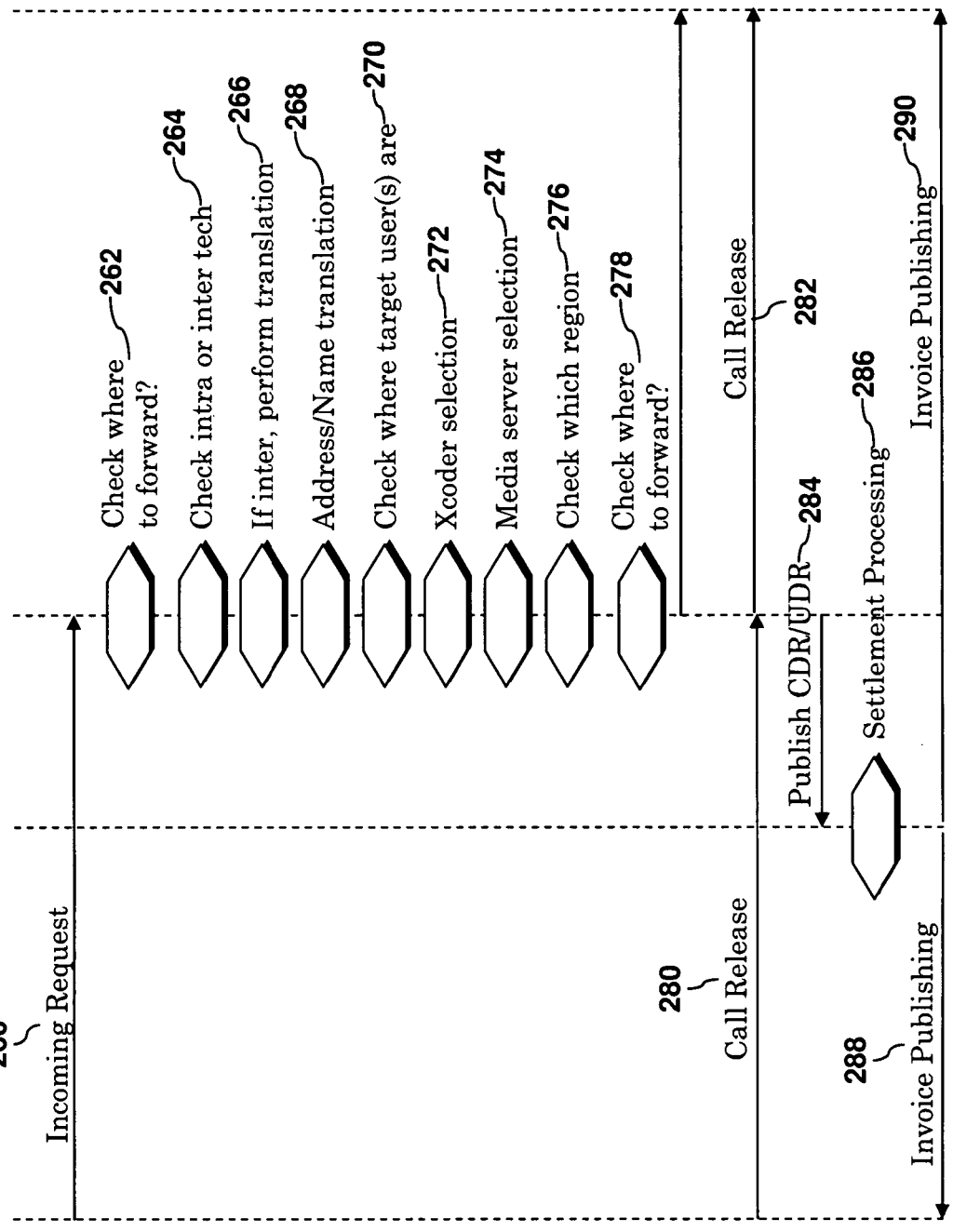
FIG. 5 is a call flow diagram illustrating an operation of the PTT inter-working architecture of the first embodiment.

Referring to FIG. 4, a first embodiment of a physical architecture to facilitate PTT interoperability across wireless carriers with disparate PTT technologies is illustrated. The architecture includes core network components 180 and regional network components 190. The core network components 180 include core inter-working components 200, a billing clearinghouse system 220 and a service delivery architecture 222. The core inter-working components 200 include network management systems 202, a location server 204, a group server 206, a policy server 208, an address translation server 210 and a centralized database 212.

The regional network 190 includes at least one point-of-presence (POP), such as POPs 240, 242 and 244. Each POP 240, 242 and 244 includes at least one custom PTT gateway (GW), an Authentication, Authorization and Accounting function (AAA) and a regional database (DB). The data in each regional database DB is replicated and synchronized with the central database 212. In one embodiment, each custom PTT gateway GW includes a proxy function, a signaling controller, a signaling bridge function for each supported technology and media gateways, as discussed above with respect to FIG. 3.

The carriers 252 may operate across a plurality of regions and connect to the inter-working architecture through a local border gateway 250. The connection between a local border gateway 250 and a carrier may be a leased line, fiber based layer 1 connection; ATM, LAN, Frame Relay based layer 2 connection; an IP VPN based layer 3 connection; or other connection as known to those skilled in the art. In one embodiment, each carrier network 252 also connects to at least one backup border gateway 250. The border gateways 250 route traffic from the carrier's network to a corresponding regional POP associated with the carrier's inter-working vendor.

Each custom gateway GW is adapted to create and forward CDRs to the billing clearinghouse 220, which stores the CDRs for subsequent processing by the settlement function. In one embodiment, to facilitate operation of PTT centric applications through the service delivery architecture 222, an inter-working vendor may include a service delivery interface 230 that includes signaling controller 232, signaling bridge 234 and media gateway 236.

In one embodiment, the carrier PTT networks 252 identify available inter-working gateways through standard discovery mechanisms, such as a DNS query. When participating in an inter-working session, the carrier PTT network is adapted to route the inter-carrier session to the appropriate custom gateway in the WWD network. The custom gateway is adapted to locate the target user(s), select media resources, perform technology translation and forward the session request to the respective carrier(s) of the target user(s).

In operation, a carrier network 252 is adapted to forward WWD requests to a regional POP associated with its WWD network interface. An embodiment of the operation of the architecture of FIG. 4 will now be described with reference to FIG. 5. An incoming WWD request 260 from Carrier 1 may be forwarded through a regional border gateway to a custom gateway in the WWD network. In one embodiment, the Carrier 1 locates an appropriate custom gateway via DNS discovery. The custom gateway may determine whether the session should be serviced by a different custom gateway, such as customer gateway in a different POP, and if appropriate, forwards the request to another custom gateway in step 262 to service the session. The custom gateway determines whether the originating and target technologies are the same (intra-technology call) or different (inter-technology call) in step 264. If the request is for an inter-technology call then the custom gateway translates the request to the target technology and performs necessary address and name translation in steps 266 and 268, respectively. The custom gateway next determines the location of the target users in step 270, selects appropriate vocoders in step 272, selects appropriate media servers in step 274 and determines the regional components serving the target carrier in step 276. The custom gateway next checks where to forward the request and then forwards the request to the appropriate target carrier network, Carrier 2, in step 278.

When the session is complete, the custom gateway releases allocated resources and terminates the PTT session. For example, if the originating caller hangs up, Carrier 1 transmits a call release message 280 to the custom gateway, which transmits a call release message 282 to Carrier 2. The custom gateway collects UDRs from the media gateway, and publishes CDRs and UDRs 284 collected during the session to the billing clearinghouse, which performs settlement processing 286 to allocate charges for the session. The billing clearinghouse subsequently publishes an invoice 288 to Carrier 1 and an invoice 290 to Carrier 2.

Figure 6:
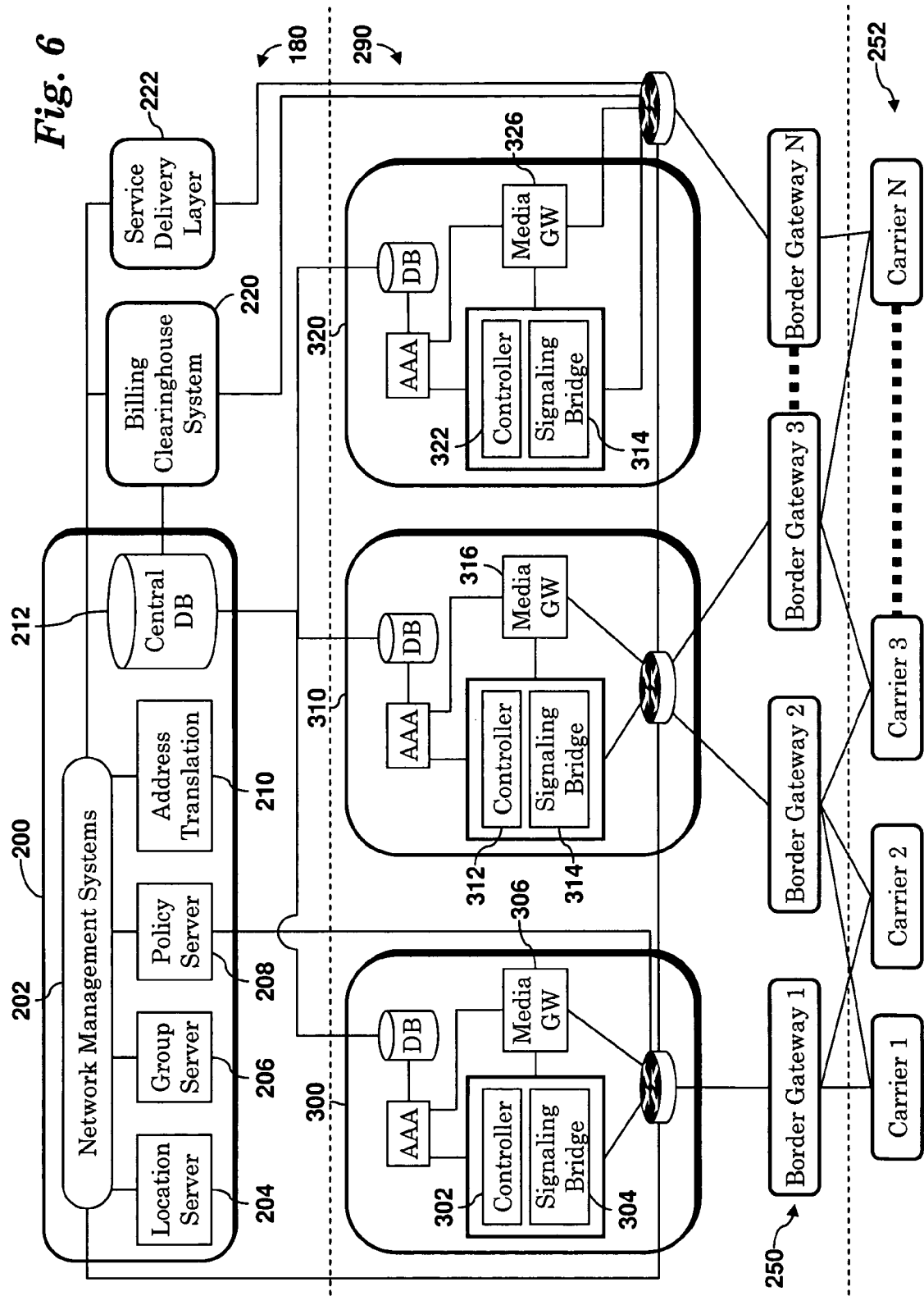
FIG. 6 illustrates a second embodiment of a PTT inter-working architecture.

A second embodiment of an architecture to facilitate PTT interoperability across wireless carriers with disparate PTT technologies is illustrated in FIG. 6. In this embodiment, the originating call is translated into a common signaling format within the WWD network before session processing, regardless of the originating and terminating technologies. After processing, the session is translated into the format of the terminating technology before being forwarded to the called party.

The second embodiment may include the same core network components 180, border gateways 250 and carrier networks 252 of the first embodiment illustrated in FIG. 4. The regional network components 290 include a plurality of POPs, such as POPs 300, 310 and 320. Each POP includes a signaling controller (302, 312, and 322, respectively), a signaling bridge (304, 314 and 324, respectively), and a media gateway (306, 316 and 326, respectively). Since every session is translated into a common format, custom gateways as used in the first embodiment are not required.

Figure 7:
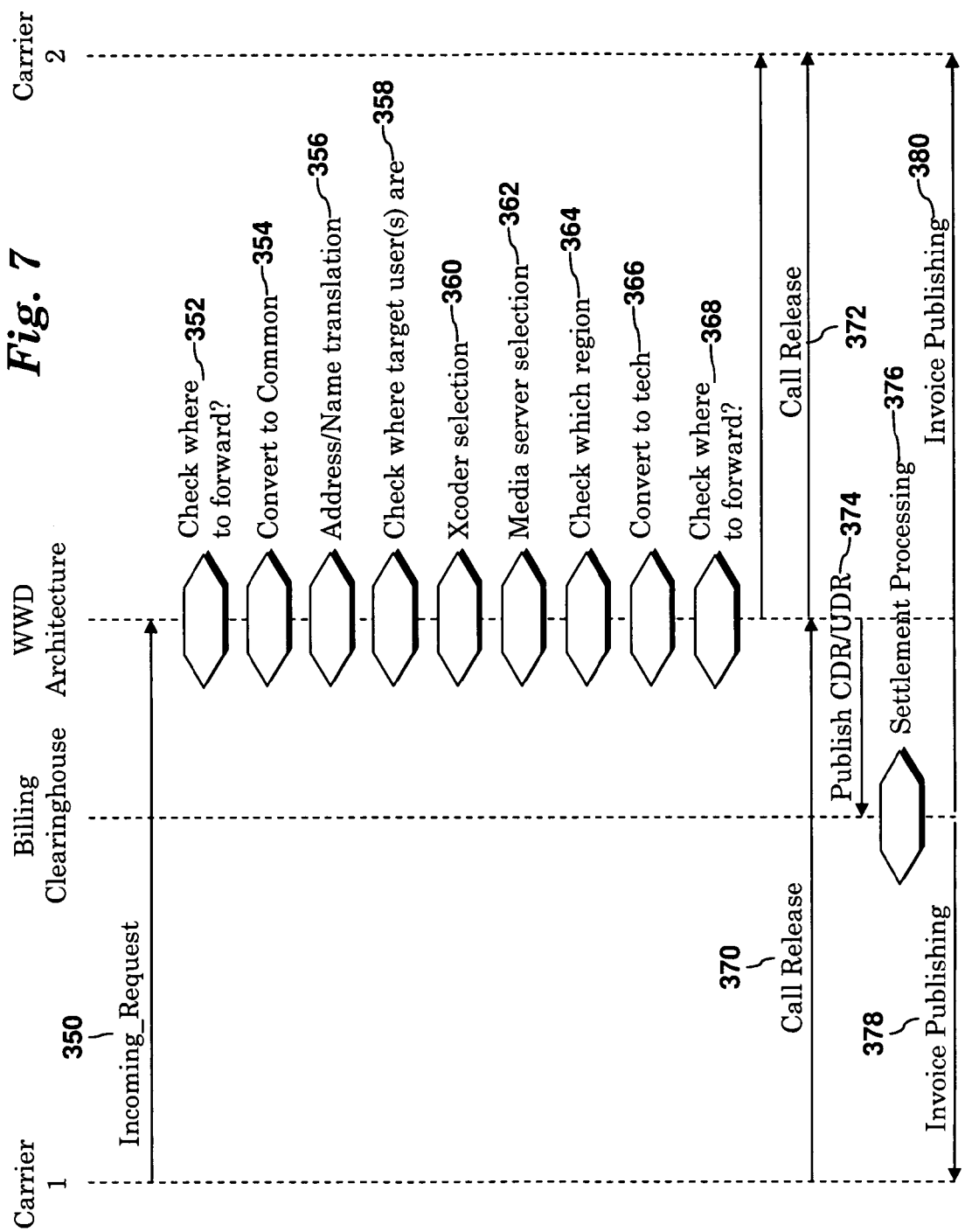
FIG. 7 is a call flow illustrating an operation of the PTT inter-working architecture of the second embodiment.

An embodiment of the operation of the architecture of FIG. 6 will now be described with reference to FIG. 7. In operation, the PTT networks 252, such as Carrier 1, route incoming WWD sessions to regional inter-working components that service the respective PTT networks. The regional inter-working components translate the incoming session request 350 into a common format used in the WWD network 354. The regional inter-working components process the call and interact with the core inter-working components and other regional inter-working components to perform address translation 356, locate the target users 358, and set up vocoders 360 and media servers 362. Regional inter-working components associated with the terminating carrier, such as Carrier 2, are identified in step 364, the session is translated into the terminating technology format in step 366, and the translated request is forwarded to the terminating carrier in step 368. Because all sessions undergo translation, irrespective of the originating and terminating technologies, the proxy function is not required in this embodiment.

When the session is complete, the WWD architecture releases allocated resources and terminates the PTT session. For example, if the originating caller hangs up, Carrier 1 transmits a call release message 370 to the WWD architecture, which transmits a call release message 372 to Carrier 2. The WWD architecture publishes CDRs and UDRs 374 collected during the session to the billing clearinghouse, which performs settlement processing 376 to allocate charges for the session. The billing clearinghouse subsequently publishes an invoice 376 to Carrier 1 and an invoice 378 to Carrier 2.

Figure 8A:
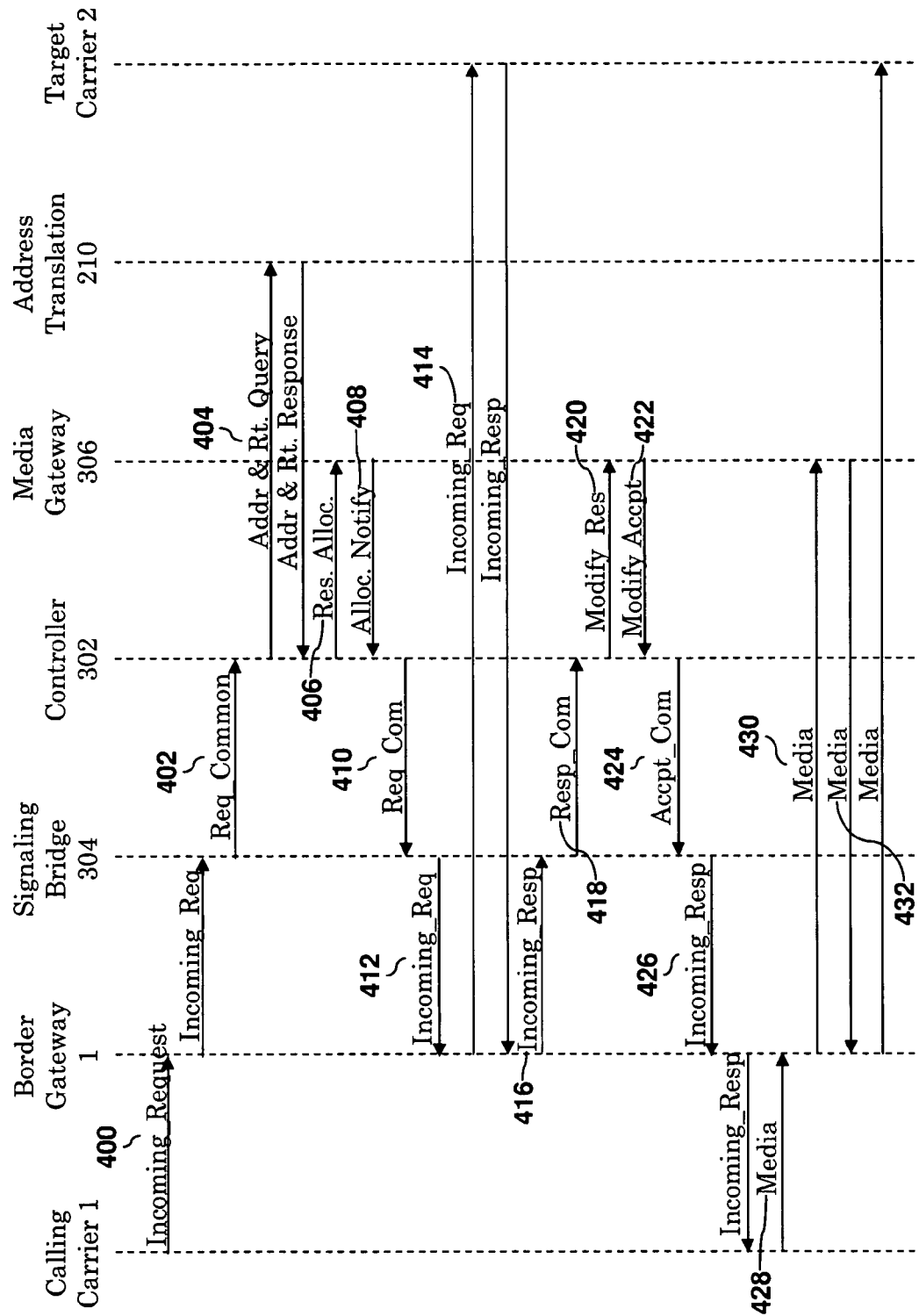
FIGS. 8a and 8b are call flow diagrams illustrating operations of the PTT inter-working architecture in accordance with the second embodiment.

The operation of the inter-working architecture of FIG. 6 will now be described in further detail with reference to the call flows illustrated in FIGS. 8a, 8b, 9a & 9b. FIG. 8a illustrates a call flow for a session traversing a single signaling bridge, controller and media gateway. The originating carrier network 1 initiates an inter-carrier PTT call to a target wireless carrier 2 by transmitting an incoming request 400 to border gateway 1, which forwards the request to signaling bridge 304 of the POP 300. The signaling bridge 304 translates the request to a common WWD format and forwards the translated request 402 to the controller 302. The controller 302 transmits a corresponding address and routing query 404 to the address translation server 210, which provides address and routing information in response. The controller 302 next communicates with a media gateway 306 to allocate the necessary resources to handle the PTT session (messages 406 and 408).

The incoming request is next forwarded to the target mobile carrier 2 in steps 410 through 414. First, the controller 302 transmits the request 410 to the signaling bridge 304, which translates the message from the common WWD format to a format compatible with the target mobile carrier 2, and transmits the incoming request 412 to the border gateway 1. The border gateway 1 transmits the incoming request 414 to the target mobile carrier 2, which responds to the request. The border gateway 1 forwards the incoming response 416 to the signaling bridge 304, which forwards the message in the common WWD format 418 to the controller 302. The controller 302 next communicates with a media gateway 306 to modify the allocated media resources as necessary to handle the PTT session (messages 420 and 422). The controller 302 forwards the accept message 424 to the signaling bridge 304 which translates the message into the format of the originating Carrier 1 and forwards the translated message 426 to the border gateway 1, which forwards the message to the originating Carrier 1.

After the PTT session is setup, the caller may speak into the dispatch device for transmission to the target user. Media packets 428 are transmitted from the calling Carrier 1 to the border gateway 1 which forwards the received media packets 430 to the media gateway 306. The media gateway 306 translates the media packets 430 into the format of target carrier 2 and returns the translated media packets 432 to the border gateway 1, which forwards the media packets to the target carrier 2, and subsequently, to the target dispatch device.

Figure 8B:
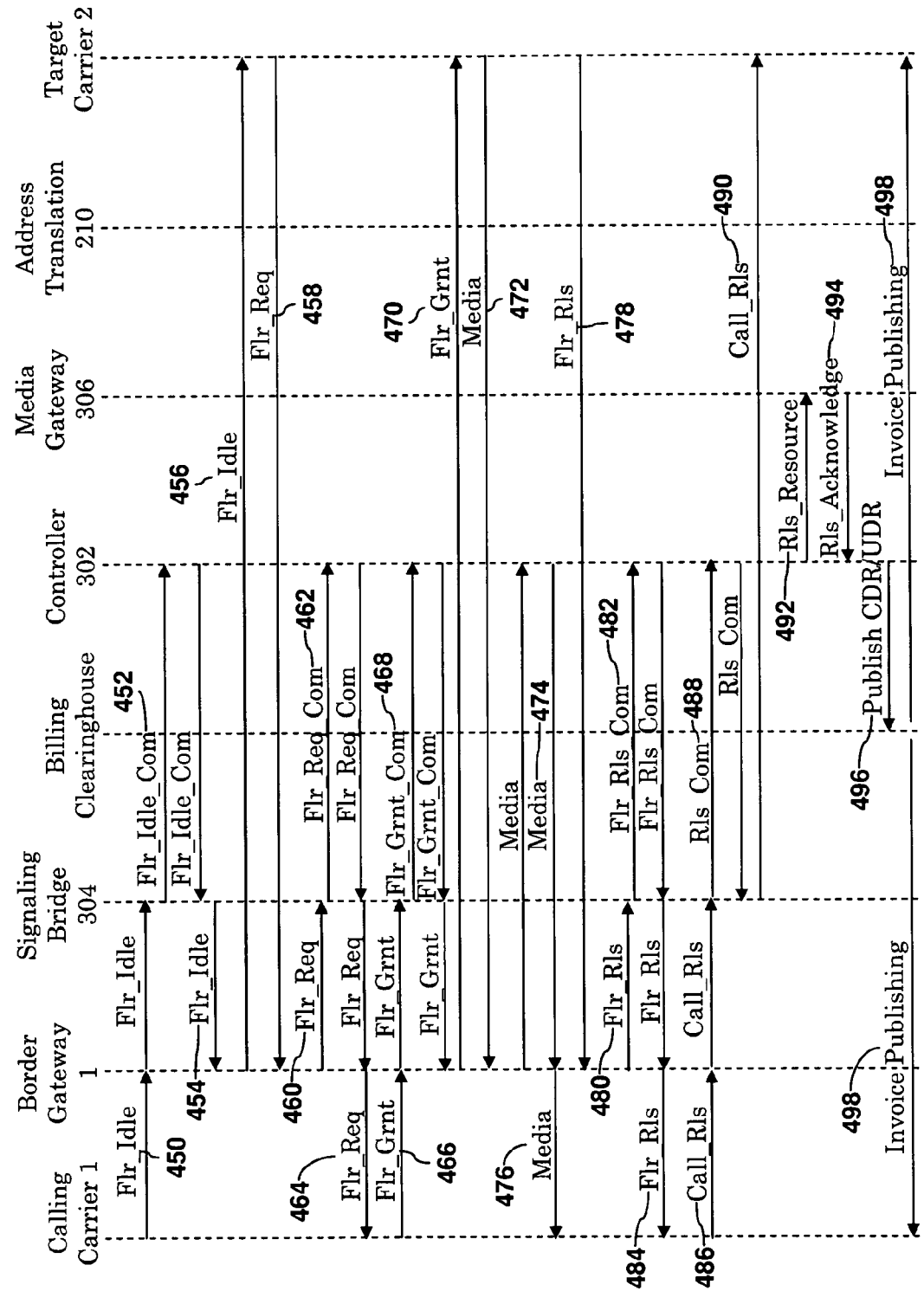

FIG. 8b illustrates a call flow for the session of FIG. 8a in which the target user transmits a voice response to the originating user. After the caller releases the PTT-button on the dispatch device, the calling carrier 1 transmits a flr_idle message 450 to indicate that the caller is relinquishing the floor. The flr_idle message 450 is transmitted to the signaling bridge 304 through border gateway 1. The signaling bridge 304 converts the flr_idle message into a common WWD format 452 used by the POP 300, and forwards the message to the controller 302. The controller 302 forwards the message to signaling bridge 304 for forwarding to the target carrier 2. The signaling bridge 304 translates the flr_idle message from the common format to the format of the target carrier 2, and forwards the translated flr_idle message 454 to the border gateway 1, which forwards the message 456 to the target carrier 2.

The user of the target device may then press the PTT-button on the target device to claim control of the floor and begin speaking. The target carrier 2 transmits a floor request, flr_req 458, to the border gateway 1, which forwards the message 460 to the signaling bridge 304. The signaling bridge 304 translates the message into a common WWD format 462 and forwards the request to the controller 302 which determines that the floor request should be sent to the calling Carrier 1 which is managing the PTT session. The signaling bridge 304 translates the flr_req message into the format of the calling Carrier 1 and forwards the message 464 to the calling Carrier 1 through the border gateway 1.

If calling Carrier 1 grants the floor to the target user, it sends a flr_grnt message 466 to the signaling bridge 304 through the border gateway 1. The signaling bridge 304 translates the flr_grnt message into the common format 468 and the controller 302 determines that the message should be forwarded to the target carrier 2. The signaling bridge 304 converts the message into the format of the target carrier 2 and transmits the flr_grnt message to the target carrier 2 through the border gateway 1. Media packets 472 carrying the target user's speech is received from the target carrier 2 and forwarded to the border gateway 1, which forwards the media to the media gateway 306 for translation into the calling carrier's format. The translated media packets 474 are then forwarded to the calling carrier 1.

When the target user releases the PTT-button, a floor release message, flr_rls 478, is transmitted from the target carrier 2 to the border gateway 1. The flr_rls message 480 is translated into a common format 482 by the controller 302, and then into the calling carrier's format 484 by the signaling bridge 304. Finally, the flr_rls message is transmitted to the calling carrier 1.

When the caller terminates the call, e.g., by hanging up, the calling carrier 1 transmits a call_rls message 486 to the border gateway 1. The message is translated by the signaling bridge 304, forwarded in message 488 to controller 302, and forwarded 490 to target carrier 3 through the signaling bridge 304. When the session is complete, the WWD architecture releases allocated resources and terminates the PTT session. The controller 302 transmits a release resource message 492 to media gateway 306 which returns a release acknowledge message 494. The media gateway 306 forwards UDRs collected during the session to the controller 302. In one embodiment, the UDRs are appended to the release acknowledge message 494. The controller 302 publishes CDRs and UDRs 496 collected during the session to the billing clearinghouse, which performs settlement processing to allocate charges for the session. The billing clearinghouse subsequently publishes invoices 498 to Carriers 1 and 2. In another embodiment, the media servers may publish the UDRs directly to the billing clearinghouse.

Figure 9A:
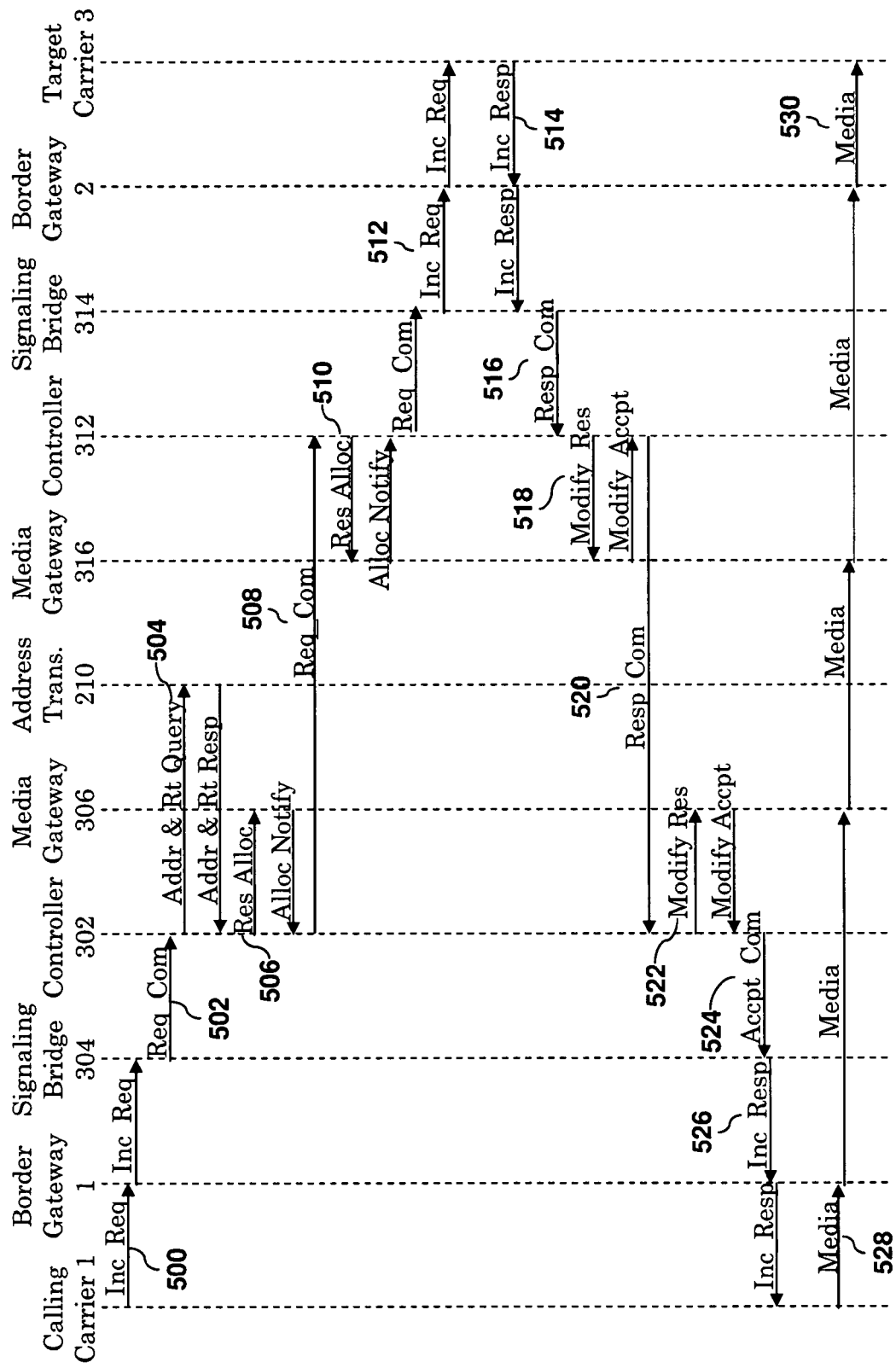
FIGS. 9a, 9b and 9c are additional call flow diagrams illustrating operations of the PTT inter-working architecture in accordance with the second embodiment.

FIG. 9a illustrates a call flow for another embodiment with the session originating and terminating in different signaling and media elements. The originating and terminating elements may be located in the same POP, or in different POPs, such as POPs 300 and 310, respectively. The calling carrier 1 initiates an inter-carrier PTT call to a target carrier 3 by transmitting an incoming request 500 to border gateway 1, which forwards the request to signaling bridge 304. The signaling bridge 304 translates the request to a common inter-working format and forwards request 502 to the controller 302. The controller 302 transmits a corresponding address and routing query 504 to the address translation server 210, which provides address and route information in response. The controller 302 next communicates 506 with the media gateway 306 to allocate necessary resources for the PTT call.

The controller 302, based on the received routing information, transmits the request 508 to controller 312. The controller 312 communicates 510 with the local media gateway 316 to allocate the resources necessary to translate media from the target carrier 3 to the common inter-carrier format. Next, the request is translated to the target carrier 3 format by the signaling bridge 314 and forwarded 512 to the target carrier 3.

The border gateway 2 receives an incoming response from the target carrier 3 and forwards the incoming response 514 to the signaling bridge 314, which forwards the response message in a common format 516 to the controller 312. After receiving the response, the controller 302 sets up media resources within the media gateway 306 by exchanging messages 518. The controller 302 next forwards the response 520 to the controller 302. The response is forwarded 522 to the media gateway 306 which returns an accept message to the controller 302. The response is then forwarded to the calling carrier 1 through the signaling bridge 304, which provides translation, and the border gateway 1.

After the PTT session is setup, the caller may speak into the dispatch device for transmission to the target user. Media packets 528 are transmitted from the calling carrier 1 to the border gateway 1 which forwards the received media packets to the media gateway 306. The media gateway 306 translates the media packets 430 into a common inter-working format and forwards the translated media packets to media gateway 316. Media gateway 316 converts the media packets from the common format to the format of target carrier 3 and transmits the media packets 530 to the target carrier 3 through the border gateway 2.

Figure 9B:
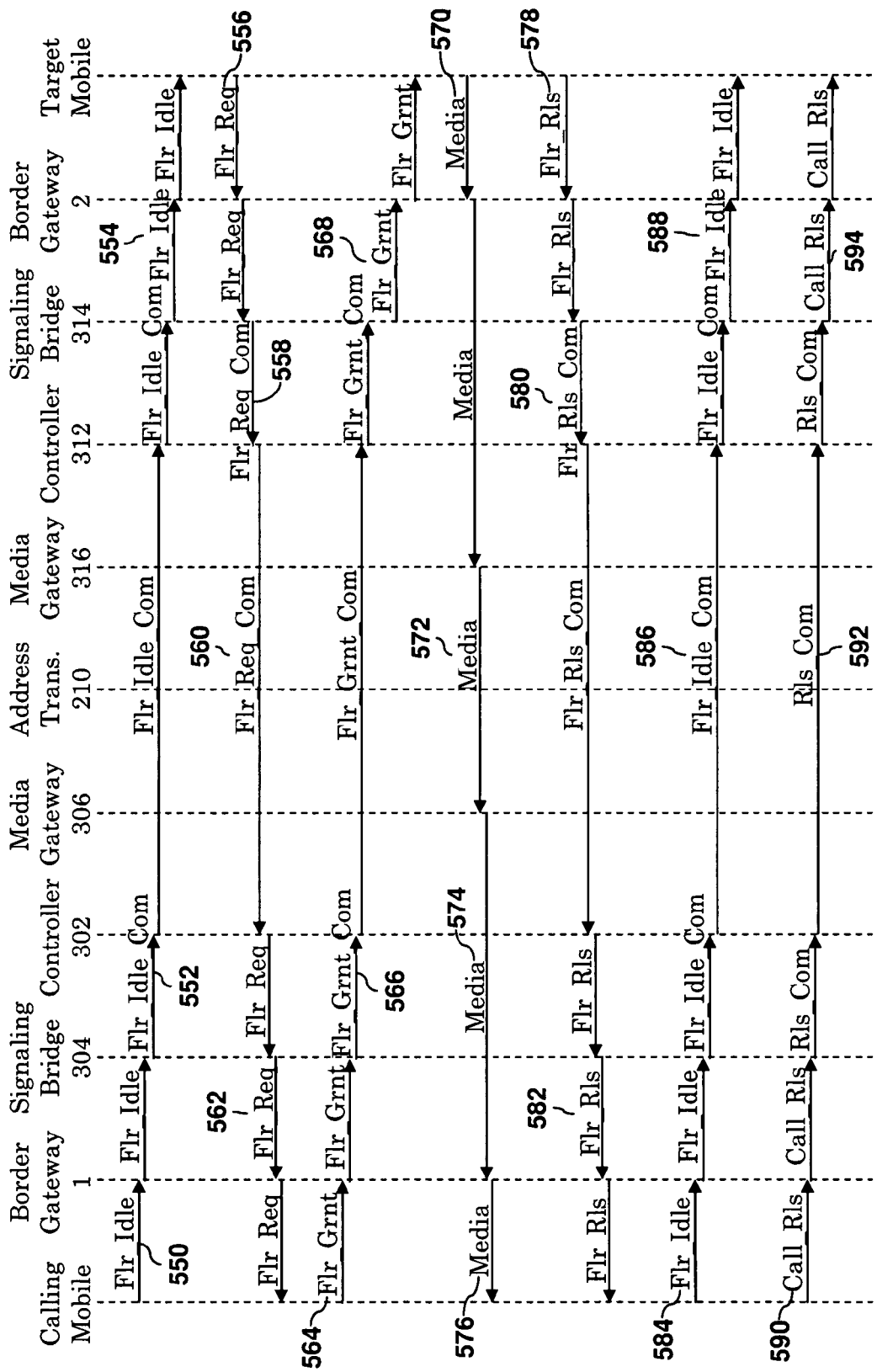

FIG. 9b illustrates a further call flow for the session of FIG. 9a in which the target user responds to the calling dispatch device. When the caller releases the PTT-button on the calling dispatch device, the calling carrier 1 transmits a flr_idle message 550 to indicate that the caller is relinquishing the floor. The flr_idle message 550 is transmitted to the signaling bridge 304 through border gateway 1. The signaling bridge 304 converts the flr_idle message into a common format 552 used by the inter-working architecture, and forwards the message to the controller 302. The controller 302 forwards the message to controller 312 which forwards the flr_idle_com message to signaling bridge 314. The signaling bridge 314 translates the flr_idle_com message from the common format to the format of the target carrier 3, and forwards the translated flr_idle message 554 to the border gateway 2, which forwards the message to the target carrier 3.

The user of the target user may then press the PTT-button on the target user to claim control of the floor and begin speaking. The target carrier 3 transmits a floor request, flr_req 556, to the border gateway 2, which forwards the message to the signaling bridge 314. The signaling bridge 314 translates the message into a common format 558 and forwards the request to the controller 312. Controller 312 determines that the floor request should be sent to the calling carrier 1 which is managing the PTT session and forwards the floor request to the controller 302. The message is then transmitted to the signaling bridge 304 which translates the flr_req message into the format of the calling carrier 1 and forwards the message 562 to the calling carrier 1 through the border gateway 1.

If calling carrier 1 grants the floor to the target user, then it returns a flr_grnt message 564 to the signaling bridge 304 through the border gateway 1. The signaling bridge translates the flr_grnt message into the common format 566 and the controller 302 determines that the message should be forwarded to the target carrier 2. The message is transmitted to the controller 312, translated by the signaling bridge 314 into the format of the target carrier 2 and forwarded to the target carrier 3 through the border gateway 2. Media packets 570 carrying the target user's audio data are received from the target carrier 3 and forwarded to the border gateway 2, which forwards the media to the media gateway 316 for translation into the common inter-working format and then to the media gateway 306 for translation into the format of the calling carrier 1. The translated media packets 576 are then forwarded to the calling carrier 1.

When the target user releases the PTT-button, a floor release message, flr_rls 578, is transmitted from the target carrier 3 to the border gateway 2. The flr_rls message 578 is translated into a common format 580 by the signaling bridge 314 and forwarded to the controller 312. The flr_idle_com message is then forwarded to the controller 302, translated by the signaling bridge 304 into the calling carrier's format 582 and forwarded to the calling carrier 1 through the border gateway 1. As illustrated, the calling carrier 1 then transmits another flr_idle message to the target carrier 2.

When the caller terminates the call, e.g., by hanging up, the calling carrier 1 transmits a call_rls message 590 to the border gateway 1. The message is translated by the signaling bridge 304, transferred between the controllers 302 and 316, translated into the target carrier's technology 594 and forwarded to the target carrier 3.

Figure 9C:
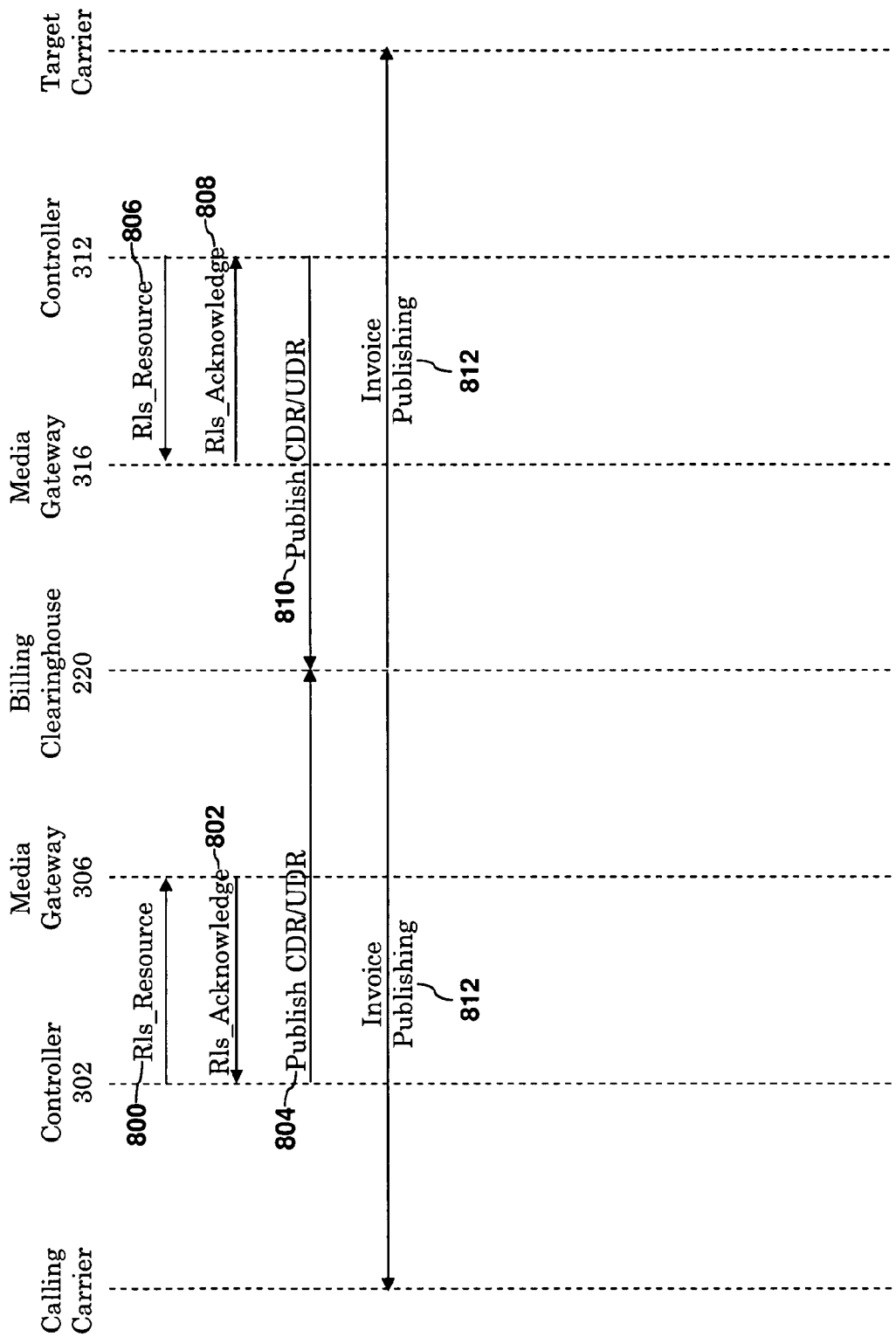

Upon receiving the call_rls message, the elements of the inter-working architecture release allocated resources and terminate the PTT session. Referring to FIG. 9c, the controller 302 transmits a release resource message 800 to media gateway 306 which returns a release acknowledge message 802. The media gateway 306 forwards UDRs collected during the session to the billing clearinghouse 220. In one embodiment, the UDRs are appended to the release acknowledge message 802. The controller 302 publishes the CDRs and UDRs 804 collected during the session to the billing clearinghouse 220, which performs settlement processing to allocate charges for the session. Similarly, controller 312 transmits a release resource message 806 to media gateway 816 which returns a release acknowledge message 808 including UDRs collected during the session. The controller 312 publishes the CDRs and UDRs 810 collected during the session to the billing clearinghouse 220. The billing clearinghouse 220 performs a settlement function to allocate charges for the session and subsequently publishes an invoice 812 to the calling carrier and an invoice 814 to the target carrier.

It will be appreciated that other session configurations and call flow routing may be implemented within the spirit and scope of the present invention. For example, it is contemplated that a PTT session may be implemented in which the PTT signaling is handled via a two signaling controllers but the media bearer paths are setup through a single media gateway.

Figure 10:
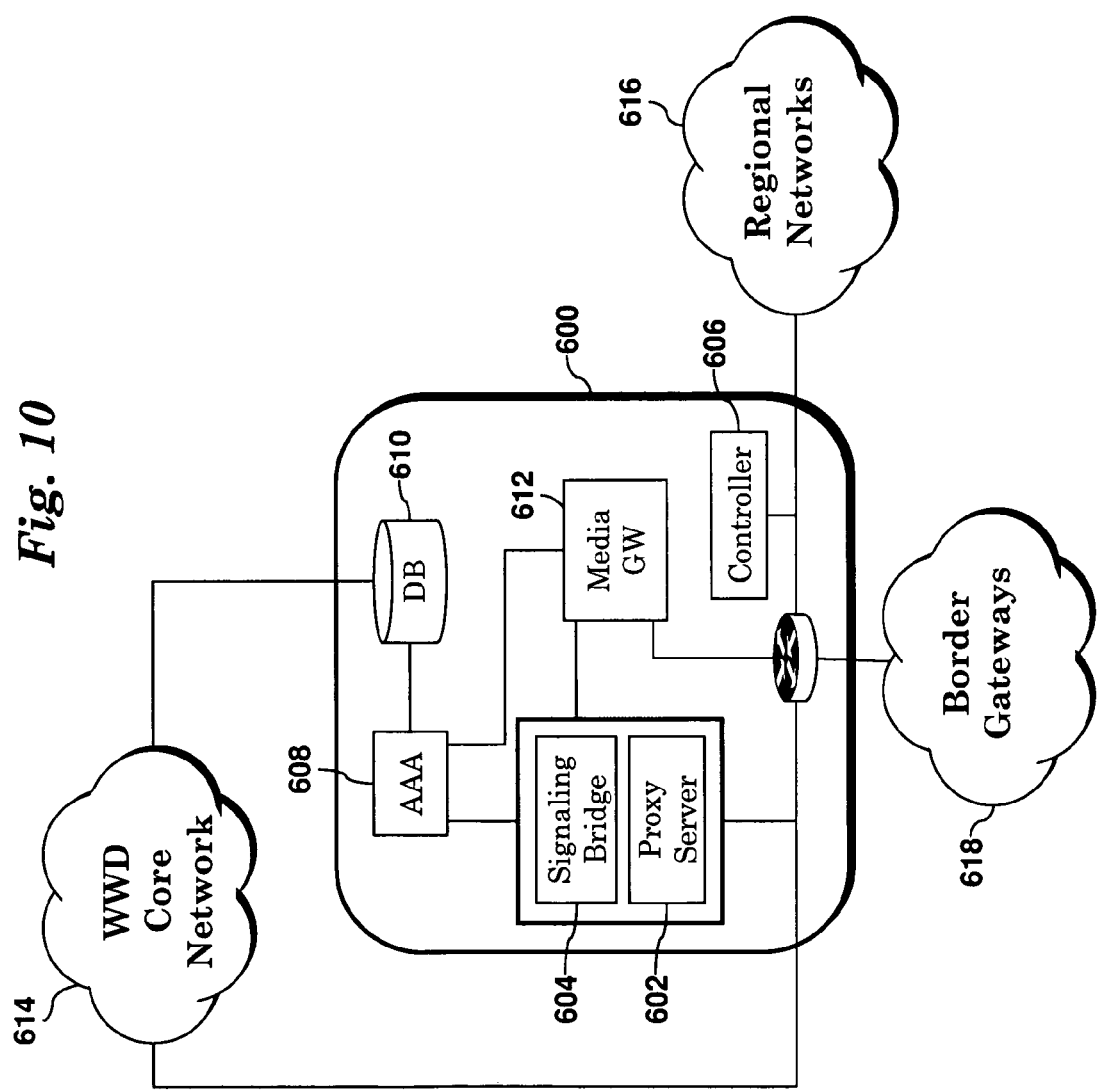
FIG. 10 illustrates a third embodiment of a PTT inter-working architecture.

A third embodiment of an inter-working architecture is illustrated in FIG. 10. This embodiment is similar to the second embodiment illustrated in FIG. 6, but includes a proxy 602 to control whether WWD sessions between carriers will be translated. As illustrated, at least one POP 600 is networked with the WWD core network 614, regional networks 616 and at least one border gateway 618. The POP 600 includes the proxy server 602, a signaling bridge 604, a controller 606, an AAA 608, a regional database 610 and a media gateway 612. By routing session through the proxy 602, sessions between carriers with the same PTT technologies will be implemented without translation into a common protocol. This reduces the call setup and floor arbitration latencies associated with the inter-working calls of the second embodiment.

Figure 11:
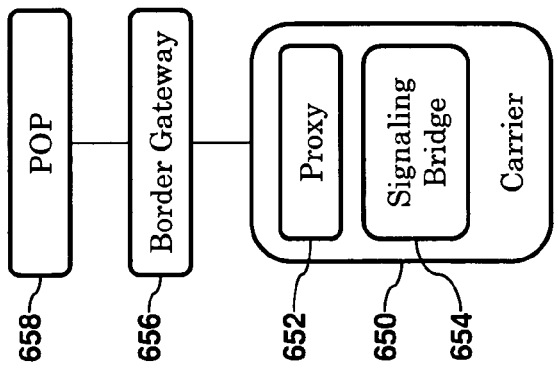
FIG. 11 illustrates a fourth embodiment of a PTT inter-working architecture.

Referring to FIG. 11, in a fourth embodiment at least one carrier network 650 includes a proxy server 652 and a signaling bridge 654. The carrier network 650 is connected to the WWD network through a border gateway 656 and a POP 658. The proxy and signaling bridge functions are included in the POP 658 (or other POPs) to serve carriers who have not deployed the signaling bridge functionality as part of their PTT infrastructure deployment. In this embodiment, the signaling traffic received from the carrier 650 by the WWD network is already in the common WWD format, as the translation is done by the carrier premises before its gets forwarded to the WWD network for further processing. The POP 658 may still determine whether conversion is required, as the session may have originated from a carrier that does not perform its own conversion. The core WWD infrastructure includes the components previously described in other embodiments.

An embodiment of the operation of the architecture of FIG. 10 will now be described with reference to FIG. 12. An incoming PTT request 620 is routed to regional inter-working components of the WWD architecture that service the originating PTT network. The regional inter-working components determine the appropriate WWD architecture components to handle the PTT session request, such as POP 600, in step 622. In step 624, if the PTT session requires translation then the proxy 602 routes the session to the signaling bridge 604 where it is converted to a common WWD protocol in step 626. In step 628, transcoders are selected for the PTT session, and then address and name translation is then performed via the controller 606 and the WWD core network 614 in step 630. If the session does not require translation then the proxy 602 bypasses steps 626 and 628. In step 632, the controller 606 determines the location of the target user(s), and in step 634 media server(s) are selected for the PTT session. The region of the target user(s) is determined in step 636. In step 638, if the PTT request requires translation then the request is converted from the common format to the target format in step 640. The PTT request is next forwarded to regional inter-working components servicing the target user(s), which may be located on a different POP, and then to the target carrier.

When the session is complete, the custom gateway releases allocated resources and terminates the PTT session. For example, if the originating caller hangs up, Carrier 1 transmits a call release message 644a to the WWD architecture, which transmits a call release message 644b to Carrier 2. During the PTT session, CDRs and UDRs are collected by the WWD architecture and published to the billing clearinghouse 645 for subsequent settlement processing 646 to allocate charges for the session. The billing clearinghouse subsequently publishes an invoice 648a to Carrier 1 and an invoice 648b to Carrier 2, including the allocated charges.

Figure 13:
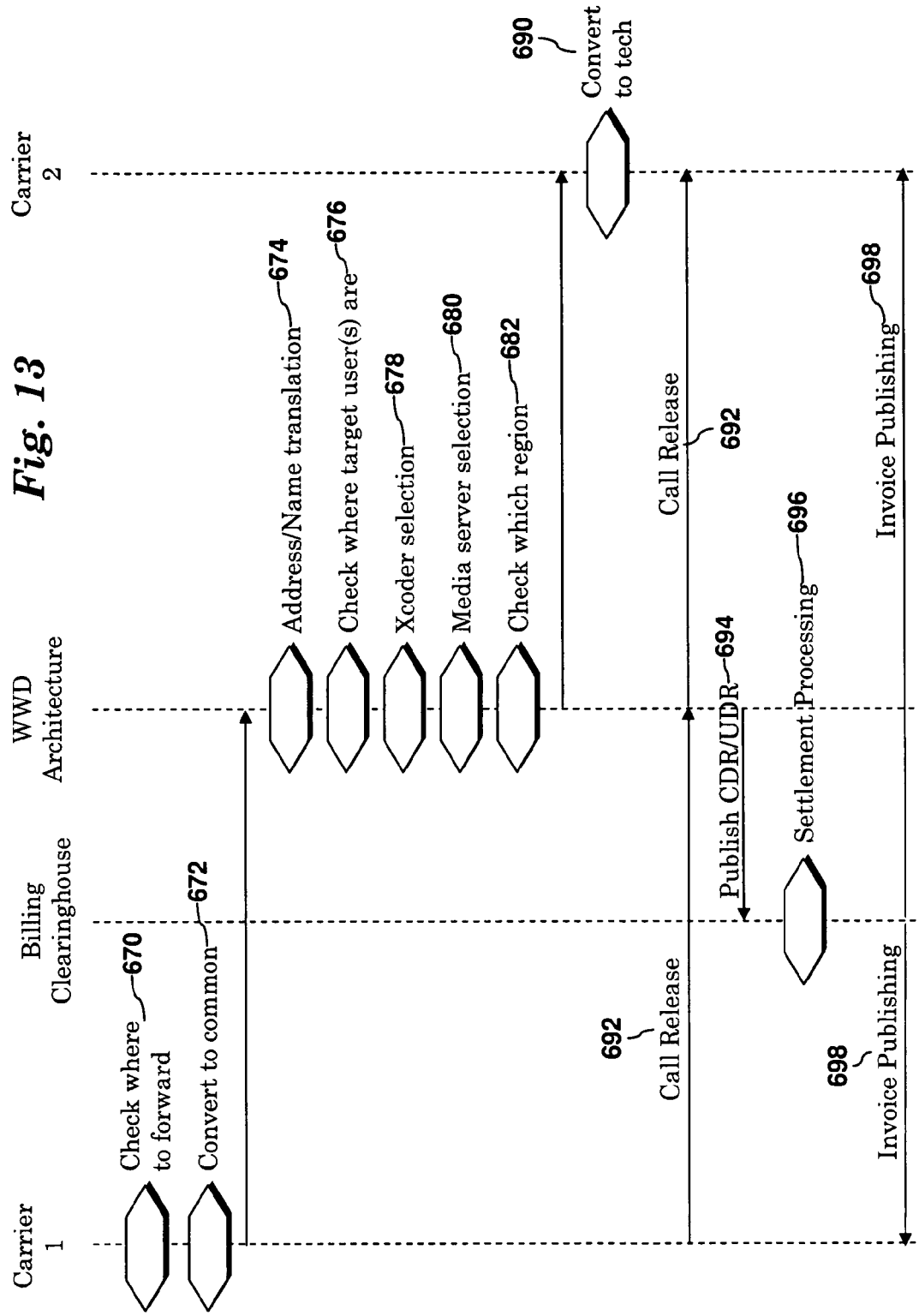
FIG. 13 is a call flow illustrating an operation of the PTT inter-working architecture of the fourth embodiment.

An embodiment of the operation of the architecture of FIG. 11 is illustrated in FIG. 13. In step 670, a local PTT carrier routes sessions either internally or to a proxy server depending on the technologies of the originating and terminating entities. If the terminating entity has the same technology then the session is forwarded without translation. If the terminating entity and originating entity operate using different technologies, then the signaling bridge 654 translates the session into the common WWD protocol in step 672 and forwards the session to the WWD network. The WWD network performs any necessary address and name translation in step 674, determines the target location in step 676, selects xcoder for the session in step 678, selects media servers for the session in step 680, and identifies the WWD target region in step 682. The WWD architecture determines whether the terminating carrier (1) uses the same technology, and thus requires no translation, (2) requires translation, or (3) handles translation in the carrier network. If the terminating carrier includes a proxy and signaling bridge then the message may be forwarded to the carrier in the common WWD format. In step 690, the terminating carrier performs any necessary conversion from the WWD format to the terminating carrier's technology.

When the session is complete the WWD architecture releases allocated resources and terminates the PTT session. For example, if the originating caller hangs up, Carrier 1 transmits a call release message 692 to the WWD architecture, which transmits the call release message to Carrier 2. The WWD architecture publishes CDRs and UDRs 694 collected during the session to the billing clearinghouse, which performs settlement processing 696 to allocate charges for the session. The billing clearinghouse subsequently publishes invoices 698 to Carriers 1 and 2.

Figure 14:
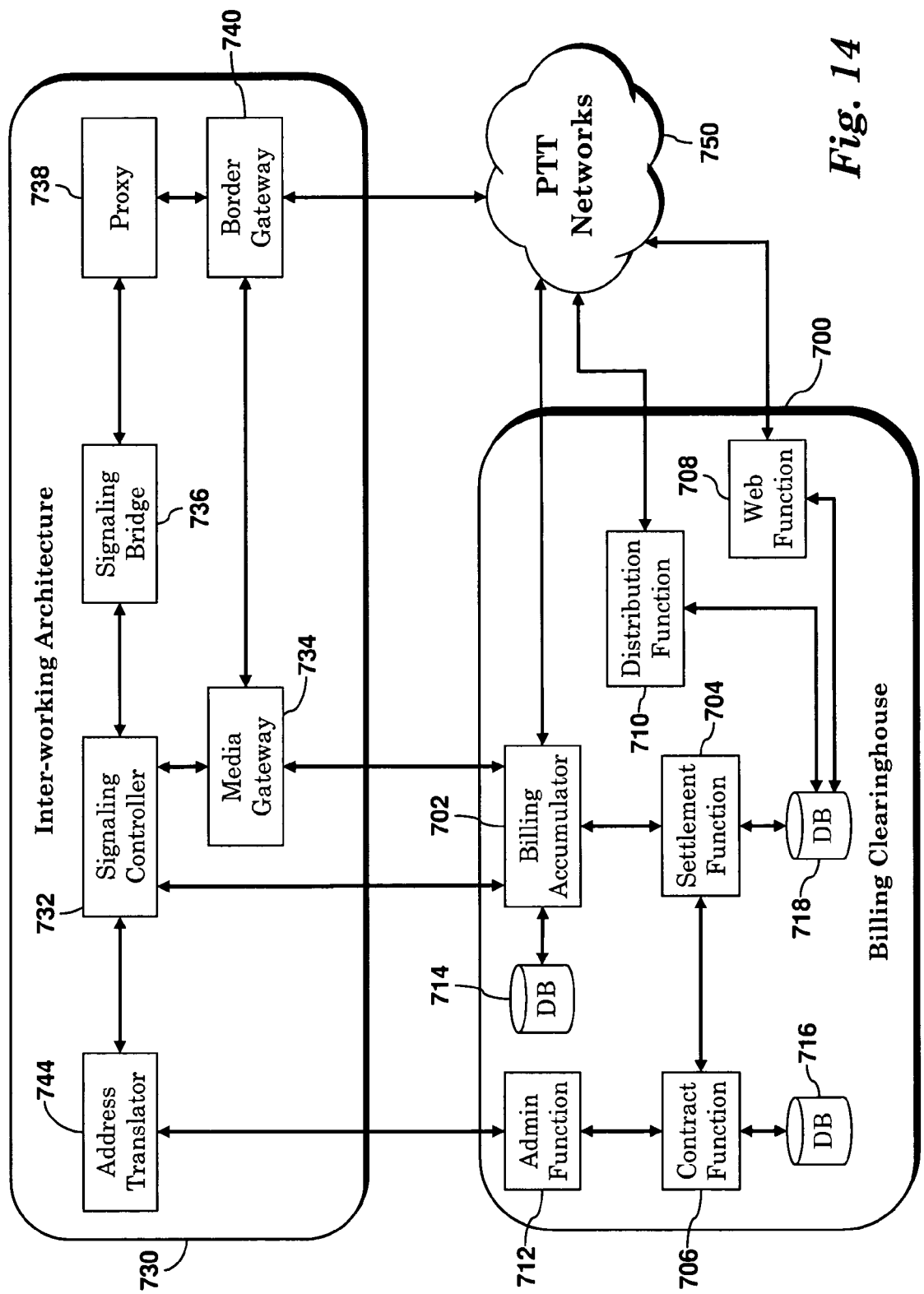
FIG. 14 is an embodiment of a billing clearinghouse architecture for a PTT inter-working architecture.

An embodiment of a billing clearinghouse architecture will now be described with reference to FIG. 14. A billing clearinghouse 700 includes a billing accumulator 702, a settlement function 704, a contract management function 706, a display/web function 708 and a distribution function 710. Each component of the billing clearinghouse 700 may be implemented as software or hardware on one or more servers.

The billing accumulator 702 receives PTT call data, including UDRs and CDRs, from the signaling controller 732 and signaling gateway 734 and applies settlement logic to PTT call data as defined by the settlement function 704. The billing accumulator 702 stores PTT call data in a database 714 adapted for failsafe operation and maintains the integrity of the raw PTT call data. In one embodiment, the billing accumulator 702 periodically retrieves PTT call data via secure FTP from the inter-working architecture 730.

Each PTT network 750 stores PTT call data for local PTT callers and bills its own subscribers through a local billing system (not shown). The billing accumulator 702 may also include an interface to the individual PTT networks 750, through which the billing accumulator 702 may receive CDRs/UDRs associated with single network PTT calls that include one or more roaming subscribers, for billing the roaming subscriber's home network and performing reconciliation and fraud analysis. The billing accumulator 702 may also transfer CDRs/UDRs between carriers for audit purposes.

The settlement function 704 transforms PTT call data from the billing accumulator 702 into inter-carrier billing data by applying negotiated rules and inter-carrier policies. The settlement function 704 queries the rules and policies for billing an associated PTT call from the contract management function 706. In one embodiment, each PTT call data record includes two or more associated PTT networks 750 that participated in the PTT call and will be billed for the use of the inter-working architecture 730. The costs of the PTT call may be split among the associated PTT networks according to negotiated rules between the PTT networks, and the rules established by the operator of the inter-working architecture. For example, the PTT carriers may have different billing models and an inter-working PTT call may be billed based on the duration of the PTT call, roaming charges, the number of pushes of the PTT button by individual participants, number of participants in the group, the number of carriers involved in the call, the number of transmitted bytes, allocated transcoding resources, and other defined charges. The billing data is stored in a database 718, from which the settlement function 704 generates settlement invoices for the PTT carriers. Billing data identifying each subscriber's transactions may be provided to each PTT carrier to pass along the costs to its subscribers.

The contract management function 706 stores and manages inter-carrier terms and conditions in the form of rules of logic for implementation by the settlement function 704 to perform reconciliation. The terms and conditions are negotiated between individual PTT carriers and may differ for each PTT call depending on negotiated billing criteria such as an identity of the originating PTT carrier, identity of the terminating PTT carriers, floor time associated with each PTT caller, call duration, and number of participating PTT callers connected through the inter-working architecture and other criteria discussed above The web function 708 provides individual carriers with secure online access to settlement invoices and PTT call data stored in database 718 for viewing and downloading. The distribution function 710 distributes settlement invoices to the carriers. In one embodiment, a secure FTP or SMTP server is used to exchange stored invoice data with the carriers, such as via ftp or email. The raw CDRs may also be accessed or distributed through a secured web FTP interface.

The administrative function 712 is connected to the address translator 744 via an interface for providing subscriber name translations to the billing clearinghouse 700. The administrative function 712 is also interfaced with the contract function 706 to provision the inter-carrier peering rules and tariffs for settlement function.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A system for facilitating the monetization of inter-carrier dispatch communications comprising:
   an inter-working network facilitating communications between a plurality of different dispatch networks and comprising a plurality of interfaces, wherein the inter-working network includes a plurality of points-of-presence (POPs) configured to generate call detail records and usage data reports;
   an originating dispatch network operated by a first carrier and interfaced to at least one of the POPs via a first border gateway associated with the first carrier;
   a target dispatch network operated by a second carrier and interfaced to at least one other of the POPs via a second border gateway associated with the second carrier;
   a billing accumulator interfaced with the plurality of POPs, the billing accumulator including logic to collect and store dispatch call data records received from the plurality of POPs; and
   a settlement entity interfaced with the billing accumulator, the settlement entity including settlement logic for converting each stored dispatch call data record to a billing record for each of the originating and target dispatch networks.

2. The system of claim 1 wherein the inter-working network includes a signaling controller adapted to manage a dispatch session between the originating dispatch network and the target dispatch network, and wherein the billing accumulator receives the dispatch call data records from the signaling controller.

3. The system of claim 2 wherein the inter-working network includes a media gateway adapted to convert real-time media between the originating dispatch network and the target dispatch network, and wherein the billing accumulator receives the dispatch call data records directly from the media gateway.

4. The system of claim 2 wherein the inter-working network includes a media gateway adapted to convert real-time media between the originating dispatch network and the target dispatch network, and wherein the billing accumulator receives the dispatch call data records from the media gateway via the signaling controller.

5. The system of claim 2 further comprising a contract entity interfaced with the settlement entity, the contract entity storing rules for converting the stored dispatch call data records to billing records in accordance with terms associated with the originating and target dispatch networks involved in the session, the stored rules directing the settlement logic.

6. The system of claim 5 further comprising an administrative entity interfaced with the inter-working network, the administrative entity receiving address translations from the inter-working architecture.

7. The system of claim 6 wherein the address translations are used to identify end users and dispatch networks associated with the dispatch session, and corresponding settlement rules to be applied to the received dispatch call data records.

8. The system of claim 1 wherein the billing accumulator is further interfaced with a first of the plurality of dispatch networks, the billing accumulator receiving roaming call data records from the first dispatch network for a roaming subscriber of the second dispatch network, the roaming call data records defining dispatch calls wherein at least one of the dispatch callers is the roaming subscriber of the second dispatch network.

9. An inter-working network for inter-working a plurality of dispatch networks, the network comprising:
a billing clearinghouse storing call detail records and usage data reports relating to dispatch sessions implemented across the plurality of dispatch networks;
a plurality of points-of-presence (POPs) connected to the billing clearinghouse, the POPs generating the call detail records and usage data reports; and
a plurality of border gateways configured to interface one of the POPs to an originating dispatch network operated by a first carrier, and to interface another one of the POPs to a target dispatch network operated by a second carrier, wherein the originating dispatch network and the target dispatch network have incompatible technologies.

10. The network of claim 9 wherein each point-of-presence interfaces with a core inter-working network to locate the target dispatch network associated with a target user, and wherein each point-of-presence is adapted to determine a regional point-of-presence serving the target dispatch network.

11. The network of claim 9 wherein the billing clearinghouse generates billing data for the originating dispatch network and billing data for the target dispatch network in accordance with the call detail records and usage data reports associated with the dispatch session.

12. The network of claim 9 wherein the billing clearinghouse generates an invoice to each of the originating dispatch network and the target dispatch network in accordance with each dispatch network's respective billing terms and conditions.

13. A method for monetizing, via an inter-working network, a plurality of disparate dispatch networks, each dispatch network providing dispatch services to a plurality of subscriber units, comprising the steps of:
receiving, by the inter-working network, a dispatch session request from an originating dispatch network operated by a first carrier via a first border gateway associated with the first carrier, the dispatch session request identifying a target user, wherein the inter-working network includes a plurality of points-of-presence (POPs) configured to generate call detail records and usage data reports;
processing, in at least one of the plurality of POPs, the dispatch session request, including allocating signaling and media resources;
forwarding, by the inter-working network using at least one other of the POPs, the dispatch session request to a second border gateway associated with a target dispatch network operated by a second carrier;
facilitating, by the inter-working network, the dispatch session between the originating dispatch network and target dispatch network; and
generating an invoice for each of the originating dispatch network and target dispatch network, including charges for facilitating the dispatch session.

14. The method of claim 13 wherein the signaling resources are allocated in a first point-of-presence and media resources are allocated in a second point-of-presence, each point-of-presence generating dispatch call data for the dispatch session.

15. The method of claim 14 further comprising aggregating the generated dispatch call data and usage data for the dispatch session.

16. The method of claim 15 further comprising applying settlement logic to the aggregated dispatch call data to produce billing data for each of the originating dispatch network and the target dispatch network.

17. The method of claim 16 wherein the settlement logic is associated with the originating dispatch network and the target dispatch network.

18. The method of claim 17 wherein the settlement logic applied to each dispatch call data record is further associated with the point-of-presence that generated the dispatch call data record.

19. The method of claim 18 wherein the settlement logic includes a set of criteria comprising at least one of a number of PTT button pushes requesting a session floor, a number of regions, a size of participating carriers, a group size for the session, a number of carriers involved in the session, a number of bytes transmitted, an identity of transcoding resources allocated, and an identify and duration of inter-working applications used.

20. The method of claim 13 further comprising:
receiving a request for an inter-working application; and
executing the inter-working application during the session, wherein the invoice includes charges for the use of the inter-working application.

* * * * *